US012340277B2

(12) United States Patent
Cao

(10) Patent No.: US 12,340,277 B2
(45) Date of Patent: Jun. 24, 2025

(54) HYBRID QUANTUM-CLASSICAL COMPUTER FOR SOLVING LINEAR SYSTEMS

(71) Applicant: Zapata Computing, Inc., Boston, MA (US)

(72) Inventor: Yudong Cao, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 1624 days.

(21) Appl. No.: 16/591,239

(22) Filed: Oct. 2, 2019

(65) Prior Publication Data

US 2020/0104740 A1 Apr. 2, 2020

Related U.S. Application Data

(60) Provisional application No. 62/740,038, filed on Oct. 2, 2018.

(51) Int. Cl.
  *G06N 10/60* (2022.01)
  *G06F 15/16* (2006.01)
  *G06N 10/20* (2022.01)
(52) U.S. Cl.
  CPC ............. *G06N 10/60* (2022.01); *G06F 15/16* (2013.01); *G06N 10/20* (2022.01)
(58) Field of Classification Search
  CPC .................................................... G06N 10/60
  See application file for complete search history.

(56) References Cited

U.S. PATENT DOCUMENTS

| | | |
|---|---|---|
| 7,590,607 B2 | 9/2009 | Williams |
| 7,877,333 B2 | 1/2011 | Macready |
| 8,700,689 B2 | 4/2014 | Macready |
| 8,832,164 B2 | 9/2014 | Allen |
| 8,832,165 B2 | 9/2014 | Allen |
| 8,897,449 B1 | 11/2014 | Broadbent |
| 9,064,067 B2 | 6/2015 | Wecker |
| 9,218,567 B2 | 12/2015 | Macready |
| 9,477,796 B2 | 10/2016 | Garcia-Ramirez |
| 9,537,953 B1 | 1/2017 | Dadashikelayeh |

(Continued)

FOREIGN PATENT DOCUMENTS

| | | |
|---|---|---|
| CN | 106611377 A | 5/2017 |
| CN | 108062587 A | 5/2018 |

(Continued)

OTHER PUBLICATIONS

Harrow, Aram W., Avinatan Hassidim, and Seth Lloyd. "Quantum algorithm for linear systems of equations." Physical review letters 103.15 (2009): 150502. (Year: 2009).*

(Continued)

*Primary Examiner* — Markus A. Vasquez
(74) *Attorney, Agent, or Firm* — Young Basile Hanlon & MacFarlane, P.C.

(57) ABSTRACT

A hybrid quantum-classical (HQC) computer system, which includes a classical computer and a quantum computer, solves linear systems. The HQC computer system splits the linear system to be solved into subsystems that are small enough to be solved by the quantum computer, under control of the classical computer. The classical computer synthesizes the outputs of the quantum computer to generate the complete solution to the linear system.

30 Claims, 8 Drawing Sheets

(56) References Cited

U.S. PATENT DOCUMENTS

| | | | |
|---|---|---|---|
| 9,836,432 | B2 | 12/2017 | Ronagh |
| 10,242,321 | B2 | 3/2019 | Bocharov |
| 10,275,717 | B2 | 4/2019 | Babbush |
| 10,325,218 | B1 | 6/2019 | Zeng et al. |
| 10,572,816 | B1 | 2/2020 | Vavilov |
| 10,666,462 | B2 | 5/2020 | Shin |
| 10,776,709 | B2 | 9/2020 | Shen |
| 10,846,366 | B1 | 11/2020 | Otterbach |
| 10,990,677 | B2 | 4/2021 | Wiebe |
| 11,010,682 | B2 | 5/2021 | Bocharov |
| 11,244,240 | B2 | 2/2022 | Martinis et al. |
| 11,488,049 | B2 | 11/2022 | Cao |
| 11,507,872 | B2 | 11/2022 | Cao |
| 11,514,134 | B2 | 11/2022 | Ronagh et al. |
| 11,537,928 | B2 | 12/2022 | Cao et al. |
| 2005/0167658 | A1 | 8/2005 | Williams |
| 2011/0060710 | A1 | 3/2011 | Amin |
| 2014/0297247 | A1 | 10/2014 | Troyer et al. |
| 2017/0147303 | A1 | 5/2017 | Amy |
| 2017/0255872 | A1 | 9/2017 | Hamze |
| 2017/0351967 | A1* | 12/2017 | Babbush ............... G06N 20/00 |
| 2017/0364796 | A1 | 12/2017 | Wiebe |
| 2018/0197102 | A1 | 7/2018 | Mohseni |
| 2018/0218279 | A1 | 8/2018 | Lechner |
| 2019/0019103 | A1 | 1/2019 | Dadashikelayeh |
| 2019/0164059 | A1 | 5/2019 | Denchev et al. |
| 2019/0164079 | A1 | 5/2019 | Gambetta et al. |
| 2019/0244680 | A1 | 8/2019 | Rolfe et al. |
| 2019/0318053 | A1 | 10/2019 | Low |
| 2019/0378032 | A1 | 12/2019 | Kliuchnikov et al. |
| 2019/0394030 | A1 | 12/2019 | Forbes |
| 2020/0057957 | A1 | 2/2020 | Johnson et al. |
| 2020/0118025 | A1 | 4/2020 | Romero et al. |
| 2020/0133947 | A1 | 4/2020 | Wang |
| 2020/0184278 | A1 | 6/2020 | Zadeh et al. |
| 2020/0202249 | A1 | 6/2020 | Hastings |
| 2020/0226197 | A1 | 7/2020 | Woerner et al. |
| 2020/0257987 | A1 | 8/2020 | McGeoch et al. |
| 2020/0272683 | A1 | 8/2020 | Ronagh et al. |
| 2020/0293936 | A1 | 9/2020 | Granade |
| 2020/0320159 | A1 | 10/2020 | Matthews |
| 2020/0327440 | A1 | 10/2020 | Cao |
| 2020/0327441 | A1 | 10/2020 | Cao |
| 2020/0334107 | A1 | 10/2020 | Katabarwa |
| 2020/0349459 | A1 | 11/2020 | Cao |
| 2020/0372094 | A1 | 11/2020 | Shehab et al. |
| 2020/0394547 | A1 | 12/2020 | Cao |
| 2021/0011748 | A1 | 1/2021 | Lee |
| 2021/0133618 | A1 | 5/2021 | Cao |
| 2021/0255856 | A1 | 8/2021 | Cao |
| 2022/0383177 | A1 | 12/2022 | Alcazar et al. |
| 2023/0023121 | A1 | 1/2023 | Cao |
| 2023/0143904 | A1 | 5/2023 | Cao |
| 2023/0153373 | A1 | 5/2023 | Wang |

FOREIGN PATENT DOCUMENTS

| | | | |
|---|---|---|---|
| CN | 112789629 | A | 5/2021 |
| EP | 3113084 | A1 | 1/2017 |
| EP | 3837647 | A1 | 6/2021 |
| EP | 4055533 | | 9/2022 |
| EP | 4139853 | A1 | 3/2023 |
| WO | 2017066695 | A1 | 4/2017 |
| WO | 2017152289 | A1 | 9/2017 |
| WO | 2017156318 | A1 | 9/2017 |
| WO | 2017189052 | A1 | 11/2017 |
| WO | 2018064535 | A1 | 4/2018 |
| WO | 2020037301 | A1 | 2/2020 |
| WO | 2020072661 | A1 | 4/2020 |
| WO | 2020142122 | A2 | 7/2020 |
| WO | 2021092351 | A1 | 5/2021 |
| WO | 2022173497 | A2 | 8/2022 |
| WO | 2022173497 | A9 | 9/2022 |
| WO | 2022271998 | A1 | 12/2022 |

OTHER PUBLICATIONS

Bravo-Prieto, Carlos, et al. "Variational quantum linear solver." arXiv preprint arXiv:1909.05820 (2019). (Year: 2019).*

International Search Report and Written Opinion mailed Jan. 29, 2020, in International Patent Application No. PCT/US2019/054316, 8 pages.

Notice of Allowance mailed Aug. 12, 2022, in U.S. Appl. No. 16/844,051 of Yudong Cao, filed Apr. 9, 2020, 17 pages.

Notice of Allowance mailed Aug. 26, 2022, for U.S. Appl. No. 16/864,998 of Yudong Cao, filed May 1, 2020, 48 pages.

Notice of Allowance mailed Sep. 21, 2022, in U.S. Appl. No. 16/543,478 of Yudong Cao, filed Aug. 16, 2019, 43 pages.

International Search Report and Written Opinion mailed Sep. 29, 2022, in PCT patent application No. PCT/US2021/062191, 8 pages.

Niu, M.Y., et al., "Learnability and Complexity of Quantum Samples," arXiv:2010.11983v1. Available at URL < https://arxiv.org/pdf/2010.11983.pdf>, pp. 1-19 (Oct. 22, 2020).

Benedetti, M., et al., "A generative modeling approach for benchmarking and training shallow quantum circuits", arXiv preprint arXiv:1801.07686v4, pp. 1-16 (Jun. 2, 2019).

Gao, N., et al., "High Dimensional Similarity Search with Quantum-Assisted Variational Autoencoder," arXiv:2006.0768v1, Available at URL https://arxiv.org/pdf/2006.07680.pdf, pp. 1-9 (Jun. 13, 2020).

Yang, S., et al., "Loop Optimization for Tensor Network Renormalization," arXiv:1512.04938v2, Available online at URL <https://arxiv.org/pdf/1512.04938.pdf>, vol. 118, No. 11, pp. 1-15 (Feb. 25, 2017).

Han, Z., et al., "Unsupervised Generative Modeling Using Matrix Product States," arXiv:1709.01662v3, Available online at URL https://arxiv.org/pdf/1709.01662.pdf, pp. 1-13 (Jul. 19, 2018).

International Search Report & Written Opinion mailed Oct. 12, 2022, in international patent application No. PCT/US2022/034799, 6 pages.

Julieta Martinez et al., "Bayesian Optimization with an Empirical Hardness Model for approximate Nearest Neighbour Search," IEEE Winter Conference on Applications of Computer Vision, Jun. 2014, 8 pages.

Simon Martiel et al., "Benchmarking quantum co-processors in an application-centric, hardware-agnostic and scalable way," arXiv:2101.12973v1, Feb. 2021, 11 pages. Retrieved from <https://arxiv.org/pdf/2102.12973v1.pdf>.

Charles A. Ellis et al., "Algorithm-Agnostic Explainability for Unsupervised Clustering," arXiv:2105.08053v1, May 2021, 11 pages. Retrieved from <https://arxiv.org/vc/arxiv/papers/2105/2105.08053v1.pdf>.

Shengcai Liu et al., "On Performance Estimation in Automatic Algorithm Configuration," The Thirty-Fourth AAAI Conference on Artificial Intelligence (AAAI-20), Feb. 2020, pp. 2384-2391.

Wang, G., et al., "Minimizing Estimation Runtime on Noisy Quantum Computers," PRX Quantum 2.1 pp. 010346-1-010346-49 (2021).

Watson, J.D., et al., "The complexity of translationally invariant problems beyond ground state energies", arXiv preprint arXiv:2012.12717, pp. 1-58 (Dec. 23, 2020).

Yigit Subas et al., "Quantum algorithms for systems of linear equations inspired by adiabatic quantum computing," Physical review letters, 122(6):060504, 2019. arXiv:1805.10549, May 26, 2018, 9 pages.

Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).

Rolando D Somma, "Quantum eigenvalue estimation via time series analysis," New Journal of Physics, 21(12):123025, 2019. arXiv:1907.11748, Jul. 26, 2019, 10 pages.

Szabo, A. and Ostlund, N.S., "Modern quantum chemistry: introduction to advanced electronic structure theory," Courier Corporation, 2012. pp . 1-479 (2012).

Rolando D Somma et al., "Spectral gap amplification," SIAM Journal on Computing, 42(2):593-610, 2013. arXiv:1110.2494, Mar. 30, 2012, 14 pages.

(56) References Cited

OTHER PUBLICATIONS

Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).
Thomas E O'Brien et al., "Calculating energy derivatives for quantum chemistry on a quantum computer," NPJ Quantum Information, 5(1):1-12, 2019.
Yigal Meir et al., "Landauer formula for the current through an interacting electron region," Physical review letters, 68(16):2512, 1992, 5 pages.
Jarrod R McClean et al., "The theory of variational hybrid quantum-classical algorithms," New Journal of Physics, 18(2):023023, 2016. arXiv: 1509.04279, Sep. 14, 2015, 20 pages.
Sam McArdle et al., "Digital quantum simulation of molecular vibrations," Chemical science, 10(22):5725-5735, 2019. arXiv:1811.04069, Nov. 9, 2018, 14 pages.
Lin, L, and Tong, Y., "Near-optimal ground state preparation," Quantum, 4:372,arXiv:2002.12508, pp. 1-22 (Dec. 6, 2020).
Huang, H., et al., "Near-term quantum algorithms for linear systems of equations," arXiv preprint arXiv:1909.07344, pp. 1-22 (Dec. 16, 2019).
Sevag Gharibian et al., "The complexity of simulating local measurements on quantum systems," Quantum, 3:189, 2019. arXiv:1606.05626, Apr. 7, 2020, 38 pages.
Sevag Gharibian et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv:1909.05981, Sep. 12, 2019, 38 pages.
Yimin Ge et al., "Faster Ground State Preparation and High-Precision Ground Energy Estimation with Fewer Qubits," Journal of Mathematical Physics, 60(2):022202, 2019. arXiv:1712.03193, Feb. 2, 2018, 25 pages.
Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.
Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).
Cao, Y., et al., "Quantum Chemistry in the Age of Quantum Computing", Quantum Physics, arXiv:1812.09976v2, pp. 1-194 (Dec. 28, 2018).
Yudong Cao et al., "Potential of Quantum Computing for Drug Discovery," IBM Journal of Research and Development, vol. 62, Issue 6, pp. 6:1-6:20, Nov./Dec. 2018.
Shantanav Chakraborty et al., "The Power of Blockencoded Matrix Powers: Improved Regression Techniques via Faster Hamiltonian Simulation," arXiv preprint arXiv:1804.01973, Sep. 3, 2018, 58 pages.
Bravo-Prieto, C., et al., "Variational Quantum Linear Solver," Quantum Physics, arXiv:1909.05820, pp. 1-21 (Sep. 12, 2019).
Ambainis, A., "On physical problems that are slightly more difficult than QMA," In 2014 IEEE 29th Conference on Computational Complexity (CCC), pp. 1-12 (2014).
Aspuru-Guzik, A., et al., "Simulated Quantum Computation of Molecular Energies", Science, Quantum Physics, vol. 309, No. 5741, pp. 1-21 (Sep. 9, 2005).
Yosi Atia et al., "Fast-Forwarding of Hamiltonians and Exponentially Precise Measurements," Nature communications, 3(1) pp. 1-9, Nov. 17, 2017.
Extended Search Report mailed Oct. 22, 2021 in European patent application No. 19869759.1, 8 pages.
Nikolaj Moll et al., "Quantum Optimization using Variational Algorithms on Near-Term Quantum Devices," Quantum Science and Technology, vol. 3, Jun. 19, 2018, 18 pages.
Final Office Action mailed Nov. 25, 2022, in U.S. Appl. No. 16/844,011 of Yudong Cao, filed Apr. 9, 2020, 32 pages.
Harrow, A. W., et al., "Quantum algorithm for linear systems of equations", Phys. Rev. Lett., vol. 103, No. 15, 1-15 (2009).
Childs, A. M., et al., "Quantum algorithm for systems of linear equations with exponentially improved dependence on precision", arXiv:1511.02306v2, pp. 1-31 (2017).
Clader, B. D., et al., "Preconditioned quantum linear system algorithm", Phys. Rev. Lett., arXiv:1301.2340v4, vol. 110, No. 25, pp. 1-5 (May 7, 2013).
Berry, D. W., "High-order quantum algorithm for solving linear differential equations", Journal of Physics A: Mathematical and Theoretical, arXiv:1010.2745v2, vol. 47, No. 10, pp. 1-14 (Jan. 28, 2014).
Berry, D. W., et al., "Quantum algorithm for linear differential equations with exponentially improved dependence on precision", arXiv:1701.03684v2, pp. 1-20 (Feb. 17, 2017).
Wiebe, N., et al., "Quantum Data Fitting", Phys. Rev. Lett., arXiv:1204.5242v2, pp. 1-6 (Jul. 3, 2012).
Rebentrost, P., et al., "Quantum support vector machine for big data classification", Physical Review Letters, arXiv: 1307.0471v3, vol. 113, No. 3, pp. 1-5 (Jul. 10, 2014).
Preskill, J., "Quantum Computing in the NISQ era and beyond", arXiv preprint arXiv:1801.00862v3, pp. 1-20 (Jul. 31, 2018).
Abrams, D. S., and Lloyd, S., et al., "A quantum algorithm providing exponential speed increase for finding eigenvalues and eigenvectors", arXiv:quant-ph/9807070v1, vol. 83, No. 24, pp. 1-9 (Jul. 24, 1998).
Nielsen, M. A., and Chuang, I. L., "Quantum Computation and Quantum Information", Cambridge University Press, pp. 704 (2000).
Peruzzo, A., et al., "A variational eigenvalue solver on a photonic quantum processor", Nature Communications, vol. 5, Article No. 4213, pp. 1-7 (2014).
Shen, Y., et al., "Quantum implementation of unitary coupled cluster for simulating molecular electronic structure", arXiv: 1506.00443v2, vol. 95, No. 2, pp. 1-6 (2015).
O'Malley, P. J. J., et al., "Scalable quantum simulation of molecular energies", Physical Review X, vol. 6, No. 3, pp. 031007-1-031007-13, (2016).
Kandala, A., et al., "Hardware-efficient Variational Quantum Eigensolver for Small Molecules and Quantum Magnets," Nature 549, arXiv:1704.05018v2, pp. 1-24 (2017).
Romero, J., et al., "Strategies for quantum computing molecular energies using the unitary coupled cluster ansatz", arXiv: 1701.02691v2 [quant-ph], vol. 4, No. 4, pp. 1-18 (Feb. 10, 2018).
McClean, J. R., et al., "Barren plateaus in quantum neural network training landscapes", Nature Communications, vol. 9, pp. 1-6 (2018).
Chamorro-Posada, P., and Garcia-Escartin, J. C., "The SWITCH test for discriminating quantum evolutions", Quantum Physics, pp. 1-5 (2017).
Aaronson, S., "Quantum Machine Learning Algorithms: Read the Fine Print", Nature Physics, vol. 11, pp. 1-5 (2015).
Whitfield, J. D., et al., "Simulation of electronic structure Hamiltonians using quantum computers", Molecular Physics, arXiv: 1001.3855v3, vol. 109, No. 5, pp. 1-22 (2011).
Cao, Y., et al., "Quantum algorithm and circuit design solving the Poisson equation," New Journal of Physics, vol. 15, pp. 1-29 (Jan. 2013).
Wang, Z., et al., "The Quantum Approximation Optimization Algorithm for MaxCut: A Fermionic View," Arxiv.org, Cornell University, 201 Olin Library Cornell University Ithaca, NY 14853, pp. 1-13 (Jun. 9, 2017), XP081277838, DOI: 10.1103/PHYSREVA.97.022304.
Extended European Search Report mailed Apr. 25, 2022, in European patent application No. 19850464.9, 11 pages.
Moll, N., et al., "Quantum optimization using variational algorithms on near-term quantum devices," Arxiv.org, Cornell University Library, 201 Olin Library Cornell University Ithaca, NY 14853, pp. 1-30 (Oct. 3, 2017), XP081147319, DOI: 10.1088/2058-9565/AAB822.
Anschuetz, E., et al., "Variational Quantum Factoring," Feb. 19, 2019, Advances in Databases and Information Systems; [Lecture Notes in Computer Science; Lect.Notes Computer], Springer International Publishing, Cham, pp. 74-85, XP047505564, ISBN: 978-3-319-10403-4.
Farhi, E., et al., "A quantum approximate optimization algorithm", Quantum Physics, arXiv:1411.4028v1, pp. 1-16 (Nov. 14, 2014).

(56) References Cited

OTHER PUBLICATIONS

Dash, A., et al., "Exact Search Algorithm to Factorize Large Biprimes and a Triprime on IBM Quantum Computer", pp. 1-13 (Jul. 2018).
Non-Final Office Action mailed Dec. 7, 2020, in U.S. Appl. No. 16/543,478 of Yudong Cao, filed Aug. 16, 2019, 33 pages.
Otterbach et al., U.S. Appl. No. 62/597,836 Specification, Provisional for U.S. Appl. No. 16/217,410, now U.S. Pat. No. 10,846,366, Dec. 2017. (Year: 2017).
Final Office Action mailed Apr. 13, 2021, in U.S. Appl. No. 16/543,478 of Yudong Cao, filed Aug. 16, 2019, 25 pages.
Non-Final Office Action mailed Sep. 3, 2021, in U.S. Appl. No. 16/543,478 of Yudong Cao, filed Aug. 16, 2019, 27 pages.
Peter W. Shor, "Polynomial-Time Algorithms for Prime Factorization and Discrete Logarithms on a Quantum Computer," SIAM J.Sci.Statist.Comput. 26, 28 pages, (1997) 1484, arXiv:9508027.
Christopher J. C. Burges, "Factoring as Optimization," Microsoft Research, Microsoft Corporation, Tech. Rep. MSR-TR-2002-83, 19 pages (2002).
Raouf Dridi et al., "Prime Factorization Using Quantum Annealing and Computational Algebraic Geometry," Nature Scientific Reports 7, Article No. 43048 (2017), 17 pages, arXiv:1604.05796.
Nikesh S. Dattani et al., "Quantum factorization of 56153 with only 4 qubits," (2014), 6 pages, arXiv:1411.6758.
Nanyang Xu et al., "Quantum Factorization of 143 on a Dipolar-Coupling Nuclear Magnetic Resonance System," Phys. Rev. Lett. 108, 130501, Mar. 30, 2012, 5 pages, arXiv:1111.3726.
Vedran Dunjko et al., "Computational Speedups Using Small Quantum Devices," (2018), 18 pages, arXiv:1807.08970.
Evgeny Dantsin et al., "A deterministic $(2-2/(k+1))^n$ algorithm for k-SAT based on local search," Theoretical Computer Science 289, pp. 69-83 (2002).
Robin A. Moser et al., "A full derandomization of Schöning's k-SAT algorithm," Proceedings of the 43rd Annual ACM Symposium on Theory of Computing—STOC '11 (ACM Press, New York, New York, USA, 2011) pp. 245-251.
International Search Report and Written Opinion mailed Dec. 4, 2019 in PCT Application No. PCT/US2019/046966, 8 pages.
Nikolaj Moll et al., "Quantum optimization using variational algorithms on near-term quantum devices," Quantum Science and Techno logy vol. 3, Jun. 19, 2018 [retrieved on Nov. 25, 2019]. Retrieved from <https://iopscience.iop.org/article/10.1088/2058-9565/aab822/pdf>.
McClean, J. R., et al., "The theory of variational hybrid quantum-classical algorithms", New Journal of Physics, vol. 18, pp. 1-22 (Feb. 5, 2016).
Eric R. Anschuetz et al. "Variational Quantum Factoring," arXiv:1808.08927vl. Aug. 27, 2018 [retrieved on Nov. 25, 2019]. Retrieved from <https://arxiv .org/pdf/1808.08927.pdf>.
Preskill, J., "Quantum Computing in the NISQ era and beyond", Jul. 31, 2018, pp. 1-20.
Bravyi, L. D., et al., "Fermionic Quantum Computation", Annals of Physics, vol. 298, No. 1, pp. 210-226 (2002).
Cao, "Hybrid quantum-classical algorithm for variational coupled cluster method", APS March Meeting 2019, vol. 64, No. 2, Monday-Friday, March pp. 4-8, 2019; Boston, Massachusetts.
Berry, D. W. et al., "Simulating Hamiltonian Dynamics with a Truncated Taylor Series", Phys. Rev. Lett. 114, 090502 pp. 1-5, Mar. 3, 2015.
Brassard, G., et al., "Quantum Amplitude Amplification and Estimation", arXiv:quant-ph/0005055v1, pp. 1-22 (May 15, 2000).
Buhrman, H. et al., "Quantum fingerprinting", Physical Review Letters, vol. 87, Issue No. 16, pp. 1-8, Sep. 2001.
Childs, A. M. et al., "Quantum algorithm for systems of linear equations with exponentially improved dependence on precision", SIAM Journal on Computing vol. 46, Issue No. 6, pp. 1-31, Jan. 2017.
Childs, A. M. et al., "Hamiltonian simulation using linear combinations of unitary operations", Quantum Information and Computation, vol. 12, pp. 901-924, 2012.
Grover, L.K., "A fast quantum mechanical algorithm for database search", STOC '96: Proceedings of the twenty-eighth annual ACM symposium on Theory of Computing, pp. 1-8 (Jul. 1996).
Grover, L. K., "Fixed-point quantum search", Physical Review Letters, Issue No. 95, vol. 15, pp. 1-13, Oct. 2005.
Kothari, R., "Efficient algorithms in quantum query complexity", PhD thesis, University of Waterloo, pp. 1-128, 2014.
Yamada, S. et al., "High Performance LOBPCG Method for Solving Multiple Eigenvalues of Hubbard Model: Efficiency of Communication Avoiding Neumann Expansion Preconditione", In: Yokota R., Wu W. (eds) Supercomputing Frontiers. SCFA 2018. Lecture Notes in Computer Science, vol. 10776. Springer, Cham, pp. 243-256.
Theodore J. Y. et al., "Fixed-point quantum search with an optimal number of queries", Physical Review Letters, Issue No. 113, vol. 21, pp. 210501-210505, Nov. 2014.
Voorhis T. V. et al., "Benchmark variational coupled cluster doubles results", Journal of Chemical Physics, 113(20):8873-8879, 2000.
Harsha, G. et al., "On the difference between variational and unitary coupled cluster theories", J. Chem. Phys. vol. 148, 044107, pp. 1-6, (2018).
Evangelista, F. A., "Alternative single-reference coupled cluster approaches for multireference problems: The simpler, the better", Journal of Chemical Physics, vol. 134(22), pp. 1-13, 2011.
Nielsen, M., "The Fermionic canonical commutation relations and the Jordan-Wigner transform", michaelnielsen.org, pp. 1-8, 2005.
Setia, K. et al., "Bravyi-Kitaev Superfast simulation of fermions on a quantum computer", arXiv:1712.00446v3 pp. 1-13, 2017.
Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).
Helgaker T. et al., "Molecular Electronic-Structure Theory", Book published by John Wiley & Sons, pp. 1-908 (2000).
Guerreschi, G. G., "Repeat-Until-Success circuits with fixed-point oblivious amplitude amplification", Phys. Rev. A 99, 022306 pp. 1-13, Aug. 10, 2018.
Terashima, H. et al., "Nonunitary quantum circuit", International Journal of Quantum Information, vol. 3, No. 4, pp. 1-19, Apr. 6, 2005.
Zujev, A., "Note on Non-Unitary Quantum Gates in Quantum Computing", Working Paper, University of California, Davis, DOI: 10.13140/RG.2.2.30712.85767, pp. 1-3, 2017.
International Search Report & Written Opinion mailed Jul. 30, 2020, in international patent application No. PCT/US2019/054795, 8 pages.
Gingrich, R. M., and Williams, C. P., "Non-unitary probabilistic quantum computing", ACM, pp. 1-6 (Sep. 15, 2003).
Notice of Allowance mailed Jun. 9, 2021 for U.S. Appl. No. 17/272,189 of Yudong Cao, filed Feb. 26, 2021, 16 pages.
G. E. Hinton et al., "Reducing the Dimensionality of Data with Neural Networks," Science, vol. 313, Jul. 28, 2006, pp. 504-508. Available online at https://www.cs.toronto.edu/~hinton/science.pdf.
Matlab "Global Optimization Toolbox," The MathWorks, Inc., Copyright 1994-2021. 12 pages. Accessible at https://www.mathworks.com/products/global-optimization.html.
TensorFlow, "TensorFlow Core: Tutorial," 39 pages, Last updated May 20, 2021 UTC. Accessible at https://www.tensorflow.org/tutorials/.
Gómez-Bombarelli, R., et al., "Automatic Chemical Design Using a Data-Driven Continuous Representation of Molecules", ACS Cent. Sci., vol. 4, No. 2, pp. 268-276 (2018).
Airbus., "Airbus Quantum Computing Challenge: Bringing flight physics into the Quantum Era", <<https://www.airbus.com/innovation/industry-4-0/quantum-technologies/airbus-quantum-computing-challenge.html>>, pp. 1-3 (Dec. 17, 2018).
International Search Report & Written Opinion mailed Feb. 26, 2021, in international patent application No. PCT/US2020/059371, 8 pages.
International Search Report & Written Opinion mailed Jun. 24, 2022, in international application No. PCT/US2022/021521, 8 pages.

(56) References Cited

OTHER PUBLICATIONS

Marsh, S., and Wang, J.B., "Combinatorial optimization via highly efficient quantum walks," Physical Review Research, vol. 2, No. 2 023302 (2020), pp. 1-8 (Jun. 8, 2020).
Non-Final Office Action mailed Jun. 24, 2022, in U.S. Appl. No. 16/844,011 of Yudong Cao, filed Apr. 9, 2020, 46 pages.
Non-Final Office Action mailed Jun. 29, 2022, in U.S. Appl. No. 16/844,051 of Yudong Cao, filed Apr. 9, 2020, 38 pages.
Extended European Search Report mailed Dec. 5, 2022, in European patent application No. 20885337.4, 11 pages.
Non-Final Office Action mailed Jan. 12, 2023, in U.S. Appl. No. 16/844,011 of Yudong Cao, filed Apr. 9, 2020, 30 pages.
Notice of Allowance mailed Feb. 8, 2023, in U.S. Appl. No. 17/702,244 of Guoming Wang, filed Mar. 23, 2022, 57 pages.
Pakin, S., and Reinhardt, S.P., "A Survey of Programming Tools for D-Wave Quantum-Annealing Processors", Lecture Notes in Computer Science, vol. 10876, pp. 103-122 (May 29, 2018) (Abstract).
Perdomo-Ortiz, A., et al., "Readiness of Quantum Optimization Machines for Industrial Applications", Arxiv.org, Cornell University Library, 201 Olin Library Cornell University Ithaca, NY 14853,pp. 1-22, XP081387006, DOI: 10/1103/PHYSREVAPPLIED. 12.014004 (Jul. 2, 2019).
Uvarov, A.V., et al., "Machine learning phase transitions with a quantum processor", Cornell University Library, pp. 1-10 (Jun. 24, 2019).
Wang, G., "Classically-Boosted Quantum Optimization Algorithm", Quantum Physics, pp. 1-30 (Mar. 29, 2022).
Chinese Office Action (including English translation) issued in CN201980064777.5, dated Oct. 30, 2023, 19 pages.

\* cited by examiner

HYBRID QUANTUM-CLASSICAL COMPUTER FOR SOLVING LINEAR SYSTEMS

BACKGROUND

Quantum computers promise to solve industry-critical problems which are otherwise unsolvable. Key application areas include chemistry and materials, bioscience and bioinformatics, and finance. Interest in quantum computing has recently surged, in part, due to a wave of advances in the performance of ready-to-use quantum computers.

One problem to which quantum computers have been applied is solving linear systems. Existing techniques for using quantum computers to solve linear systems, however, cannot be implemented on current quantum computers, which are noisy and have low circuit depths. Solving linear systems of equations is a problem of broad application in science and engineering.

What is needed, therefore, are improvements to quantum computers for solving linear systems. Such improvements would have a wide variety of applications in science and engineering.

SUMMARY

A hybrid quantum-classical (HQC) computer system, which includes both a classical computer and a quantum computer, solves linear systems. The HQC computer system iteratively optimizes a quantum ansatz state to minimize an objective function which is equivalent to solving the linear system in question.

Other features and advantages of various aspects sand embodiments of the present invention will become apparent from the following description and from the claims.

In a first aspect, a method for preparing a quantum state that approximates a solution x to a linear system of equations $A\vec{x}=\vec{b}$ for a matrix A and a vector $\vec{b}$ includes generating, on a classical computer, an objective function that depends on: (1) at least one expectation-value term derivable from the matrix A, and (2) at least one overlap term derivable from the vector $\vec{b}$ and the matrix A, such that an optimal assignment of the objective function corresponds to an approximate solution of the linear system. The method also includes training a set of circuit parameters $\vec{\theta}$ by: (1) on a quantum computer, controlling a plurality of qubits, according to the set of circuit parameters $\vec{\theta}$, to prepare a quantum state $|\psi(\vec{\theta})\rangle$; (2) on the quantum computer, obtaining a measured sample, the measured sample being one of: (i) a bit-string of binary values obtained by measuring the plurality of qubits according to a Pauli string derived from the matrix A, and (ii) a measurement of overlap between the quantum state $|\psi(\vec{\theta})\rangle$ and a quantum b-state $|b\rangle$ that encodes the vector $\vec{b}$ on the quantum computer; (3) on the classical computer, generating an estimate of the objective function based on the measured sample; and (4) on the classical computer, updating the circuit parameters $\vec{\theta}$, based on the estimate of the objective function, to optimize a subsequent estimate of the objective function.

In some embodiments of the first aspect, (b) further includes: (5) on the classical computer, determining whether the estimate of the objective function satisfies a convergence criterion; and (6) returning to (b)(1) if the estimate of the objective function does not satisfy the convergence criterion.

In some embodiments of the first aspect, (b)(1) further includes: (a) initiating the plurality of qubits to prepare a reference state; and (b) driving the plurality of qubits according to a parameterized quantum circuit to transform the reference state into the quantum state $|\psi(\vec{\theta})\rangle$.

In some embodiments of the first aspect, (b)(1)(a) includes using a mean-field approximation based on self-consistent iterations.

In some embodiments of the first aspect, the mean-field approximation is a Hartree-Fock approximation.

In some embodiments of the first aspect, the parameterized quantum circuit includes an alternating operator ansatz.

In some embodiments of the first aspect, the parameterized quantum circuit implements a unitary coupled-cluster ansatz of a certain level of excitation.

In some embodiments of the first aspect, the method further includes using a Moller-Plesset perturbation theory approximation method to generate an initial assignment for the set of circuit parameters $\vec{\theta}$.

In some embodiments of the first aspect, (b)(1) includes: (i) initiating the plurality of qubits to prepare a reference state; and (ii) driving the plurality of qubits according to a tunable annealing schedule to transform the reference state into the quantum state $|\psi(\vec{\theta})\rangle$.

In some embodiments of the first aspect, preparing the quantum state $|\psi(\vec{\theta})\rangle$ in (b)(1) includes using a nearest-neighbor matchgate circuit acting on a one-dimensional qubit chain. The state $|\psi(\vec{\theta})\rangle$ then represents a fermionic Gaussian state which is obtainable efficiently using a classical approximation.

In some embodiments of the first aspect, the objective function includes $\langle\psi(\vec{\theta})|A^\dagger A|\psi(\vec{\theta})\rangle - 2\text{Re}\langle|A|\psi(\vec{\theta})\rangle$.

In some embodiments of the first aspect, the objective function includes $\langle\psi(\vec{\theta})|A|\psi(\vec{\theta})\rangle/2 - \langle\psi(\vec{\theta})|b\rangle$.

In some embodiments of the first aspect, the method further includes splitting the matrix A into a linear combination of component matrices, each representable by a Pauli string.

In some embodiments of the first aspect, the matrix A is a fermionic Hamiltonian representing n spin orbitals as a sum of Pauli strings, wherein a number of the Pauli strings scales no more than polynomially with n.

In some embodiments of the first aspect, the method further includes preparing the quantum b-state $|b\rangle$ on the quantum computer before obtaining the measurement of overlap.

In some embodiments of the first aspect, (b) produces a final set of circuit parameters $\vec{\theta}*$ such that $$|\psi(\vec{\theta}^*)\rangle \approx \frac{A^{-1}|\psi(\vec{\theta})\rangle}{\||A^{-1}|\psi(\vec{\theta})\rangle\|}$$

is iteratively applied to yield a sequence of quantum states $|\psi_1\rangle, |\psi_2\rangle, \ldots, |\psi_t\rangle$ such that for each $$k = 0, 1, \ldots, t-1 |\psi_{k+1}\rangle \approx \frac{A^{-1}|\psi_k\rangle}{\|A^{-1}|\psi_k\rangle\|}.$$

In a second aspect, a hybrid quantum-classical computing system, for preparing a quantum state that approximates a solution x to a linear system of equations $A\vec{x} = \vec{b}$ for a matrix A and a vector $\vec{b}$, includes a quantum computing component having a plurality of qubits and a qubit controller that manipulates the plurality of qubits. The quantum-classical computing system also includes a classical computing component storing machine-readable instructions that, when executed by the classical computing component, control the classical computing component to cooperate with the quantum computing component to perform the operations of: (a) on the classical computing component, generating an objective function that depends on: (1) at least one expectation-value term derivable from the matrix A, and (2) at least one overlap term derivable from the vector $\vec{b}$ and the matrix A, such that an optimal assignment of the objective function corresponds to an approximate solution of the linear system; and (b) training a set of circuit parameters $\vec{\theta}$. The training includes (1) on the quantum computing component, controlling a plurality of qubits, according to the set of circuit parameters $\vec{\theta}$, to prepare a quantum state $|\psi(\vec{\theta})\rangle$; (2) on the quantum computing component, obtaining a measured sample, the measured sample being one of: (i) a bit-string of binary values obtained by measuring the plurality of qubits according to a Pauli string derived from the matrix A, and (ii) a measurement of overlap between the quantum state $|\psi(\vec{\theta})\rangle$ and a quantum b-state $|b\rangle$ that encodes the vector $\vec{b}$ on the quantum computing component; (3) on the classical computing component, generating an estimate of the objective function based on the measured sample; and (4) on the classical computing component, updating the circuit parameters $\vec{\theta}$, based on the estimate of the objective function, to optimize a subsequent estimate of the objective function.

In some embodiments of the second aspect, (b) further includes: (5) on the classical computing component, determining whether the estimate of the objective function satisfies a convergence criterion; and (6) returning to (b)(1) if the estimate of the objective function does not satisfy the convergence criterion.

In some embodiments of the second aspect, (b)(1) includes: (a) initiating the plurality of qubits to prepare a reference state; and (b) driving the plurality of qubits according to a parameterized quantum circuit to transform the reference state into the quantum state $|\psi(\vec{\theta})\rangle$.

In some embodiments of the second aspect, (b)(1)(a) includes using a mean-field approximation based on self-consistent iterations.

In some embodiments of the second aspect, the mean-field approximation includes a Hartree-Fock approximation.

In some embodiments of the second aspect, the parameterized quantum circuit comprises an alternating operator ansatz.

In some embodiments of the second aspect, the parameterized quantum circuit implements a unitary coupled-cluster ansatz of a certain level of excitation.

In some embodiments of the second aspect, the classical computing component stores additional machine-readable instructions that control the classical computing component to cooperate with the quantum computing component to use a Moller-Plesset perturbation theory approximation method to generate an initial assignment for the set of circuit parameters $\vec{\theta}$.

In some embodiments of the second aspect, (b)(1) includes: (i) initiating the plurality of qubits to prepare a reference state; and (ii) driving the plurality of qubits according to a tunable annealing schedule to transform the reference state into the quantum state $|\psi(\vec{\theta})\rangle$.

In some embodiments of the second aspect, preparing the quantum state $|\psi(\vec{\theta})\rangle$ in (b)(1) includes using a nearest-neighbor matchgate circuit acting on a one-dimensional qubit chain. Here, the state $|\psi(\vec{\theta})\rangle$ represents a fermionic Gaussian state which is obtainable efficiently using a classical approximation.

In some embodiments of the second aspect, the objective function includes $\langle \psi(\vec{\theta})|A^\dagger A|\psi(\vec{\theta})\rangle - 2\mathrm{Re}\langle |A|\psi(\vec{\theta})\rangle$.

In some embodiments of the second aspect, the objective function includes $\langle \psi(\vec{\theta})|A|\psi(\vec{\theta})\rangle/2 - \langle \psi(\vec{\theta})|b\rangle$.

In some embodiments of the second aspect, the classical computing component stores additional machine-readable instructions that control the classical computing component to cooperate with the quantum computing component to split the matrix A into a linear combination of component matrices, each representable by a Pauli string.

In some embodiments of the second aspect, the matrix A is a fermionic Hamiltonian representing n spin orbitals as a sum of Pauli strings, wherein a number of the Pauli strings scales no more than polynomially with n.

In some embodiments of the second aspect, the classical computing component stores additional machine-readable instructions that control the classical computing component to cooperate with the quantum computing component to prepare the quantum b-state $|b\rangle$ on the quantum computing component before obtaining the measurement of overlap.

In some embodiments of the second aspect, (b) produces a final set of circuit parameters $\vec{\theta}^*$ such that $$|\psi(\vec{\theta}^*)\rangle \approx \frac{A^{-1}|\psi(\vec{\theta})\rangle}{\|A^{-1}|\psi(\vec{\theta})\rangle\|}$$

is iteratively applied to yield a sequence of quantum states $|\psi_1\rangle, |\psi_2\rangle, \ldots, |\psi_t\rangle$ such that for each $$k = 0, 1, \ldots, t-1 |\psi_{k+1}\rangle \approx \frac{A^{-1}|\psi_k\rangle}{\|A^{-1}|\psi_k\rangle\|}.$$

DETAILED DESCRIPTION

Figure 1:
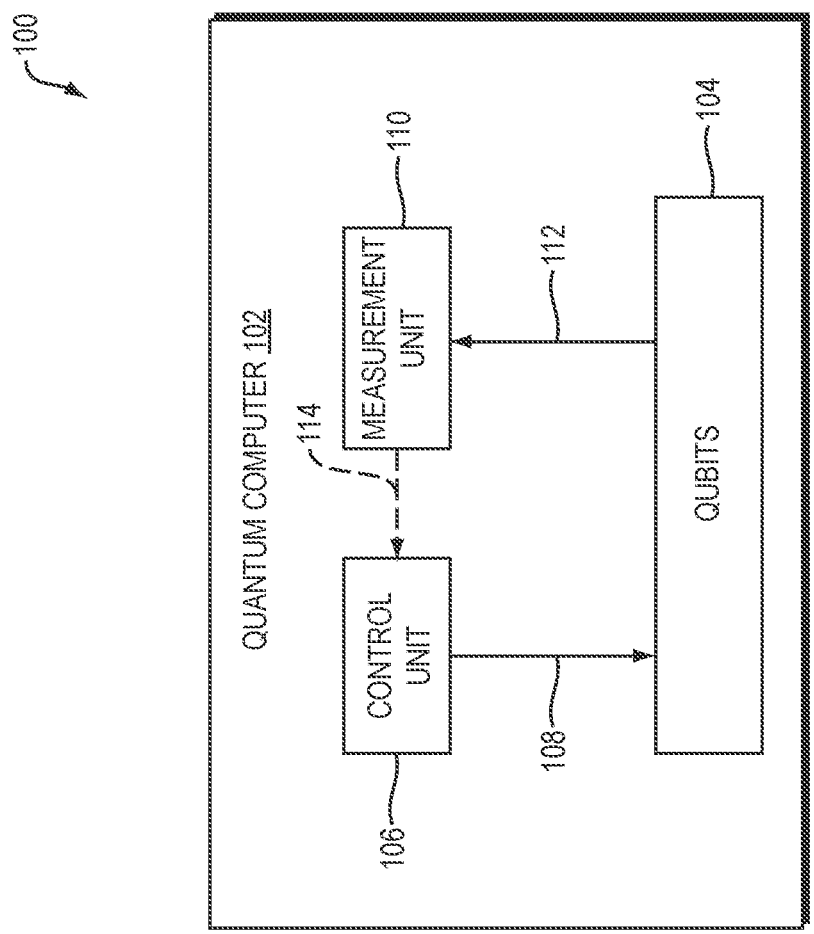
FIG. 1 shows a diagram of a system implemented according to one embodiment of the present invention.

Embodiments of the present invention use a hybrid quantum-classical (HQC) computer system to approximately prepare a quantum state $|x'\rangle$ which is proportional to the solution vector x of a linear system. The goal is to extract some particular feature from the state $|x'\rangle$, e.g., the expectation value $\langle x'|M|x'\rangle$ for some measurement operator M. On a classical computer, computing such an expectation value could be expensive if the dimension of x is large. However, on a quantum computer an N-dimensional state requires only O(log N) qubits to store. Hence, on a quantum computer the expectation $\langle x'|M|x'\rangle$ is exponentially faster to compute. With existing or near-term quantum computers having around 50 qubits, the ability to encode a problem of size $2^{50}$ is already on the verge of tractability for classical supercomputers.

One well-known technique within the field of quantum computing is the variational quantum eigensolver (VQE), which requires only shallow quantum circuits to prepare an ansatz state $|\psi(\vec{\theta})\rangle$ determined by classical parameters $\vec{\theta}$ in conjunction with a classical computer running black-box optimization to find the optimal $\vec{\theta}$. A common application of VQE is to approximate the ground state of a given Hamiltonian.

Embodiments of the present invention use an approach that is analogous to VQE for linear systems or least-squares fitting, which is referred to herein as the variational quantum linear systems solver (VQLSS). The problem of solving linear systems entails finding a vector $\vec{x}$ such that $A\vec{x}=\vec{b}$ for some matrix A and a vector $\vec{b}$. There are three separate cases. First, if A is full rank, then the solution is unique. Second, if A is not full rank, then there is not a unique solution and the set of solutions forms a linear subspace. Third, if A is over-constrained (namely, the row rank of $A^T$ is not full), then there is no solution and the problem becomes more generally a least-squares problem $\min_{\vec{x}}\|A\vec{x}-\vec{b}\|$. If the norm is the 2-norm, then the problem can be equivalently stated as $$\min_{\vec{x}}[\vec{x}^\dagger A^\dagger A\vec{x} - (\vec{b}^\dagger A\vec{x} + \vec{x}^\dagger A^\dagger \vec{b}) + \vec{b}^\dagger \vec{b}]. \quad (1)$$

Note that Eqn. 1 captures all three scenarios mentioned above.

Embodiments of VQLSS use a parameterized ansatz $|\Psi(\vec{\theta})\rangle$ to search for $$\vec{\theta}^* = \mathrm{argmin}_\theta[f(\vec{\theta})] = \mathrm{argmin}_\theta[\langle\psi(\vec{\theta})|A^\dagger A|\psi(\vec{\theta})\rangle - 2\mathrm{Re}\langle b|A|\psi(\vec{\theta})\rangle], \quad (2)$$

where the superscript † indicates the Hermitian transpose. In Eqn. 2, the argument of the argmin function is one example of an objective function $f(\vec{\theta})$. The first term of $f(\vec{\theta})$ is the expectation value of the operator $A^\dagger A$ with respect to the ansatz $|\psi(\vec{\theta})\rangle$. The second term of $f(\vec{\theta})$ can also be evaluated efficiently using known methods, as described in more detail below. Another example of the objective function is $f(\vec{\theta}) = \langle\psi(\vec{\theta})|A|\psi(\vec{\theta})\rangle/2 - \langle\psi(\vec{\theta})|b\rangle$. Another objective function $f(\vec{\theta})$ may be used without departing from the scope hereof.

Embodiments herein may be applied to problems in a variety of fields, such as quantum chemistry and differential equations.

Embodiments herein implement VQLSS using a hybrid quantum-classical (HQC) computer system. In general, the classical computer starts by splitting the problem into subproblems that are easy to solve on a quantum computer but hard for classical computers. After solving these subproblems using a quantum computer, the classical computer then combines the data from the quantum computer to assess the quality of the current solution candidate.

More specifically, the matrix in the linear system to be solved is split by the classical computer of the HQC computer system into matrices which are operators that are easy to implement on a quantum computer, such as tensor products of Pauli matrices. The HQC computer system attempts to minimize an objective function. The solution x* which minimizes the objective function is the solution to the linear system. To be able to minimize the objective function, it is necessary to evaluate the objective function. Such evaluation is challenging on classical computers for large problems but much more efficient on a quantum computer. In embodiments, a quantum computer evaluates the objective function by first splitting the matrix A into a linear combination of composite matrices such that the composite matrices and their products can be directly measured on the quantum computer. The linear combination is then applied to the objective function, rendering the objective function a weighted sum of terms directly measurable by the quantum computer. After the transformation of the objective function is completed, the quantum computer evaluates each term of the objective function, and an estimate for the objective function is determined.

Compared with existing quantum algorithms for solving linear systems, which require circuit depth too large for current devices, the HQC computer system of the present invention does not require deep circuitry and is more practical for existing and near-term quantum computers. Instead, using both a classical computer and a quantum computer having a moderate number of qubits in this way enables embodiments of the present invention to solve linear systems of sizes which are beyond current classical computation.

Figure 4:
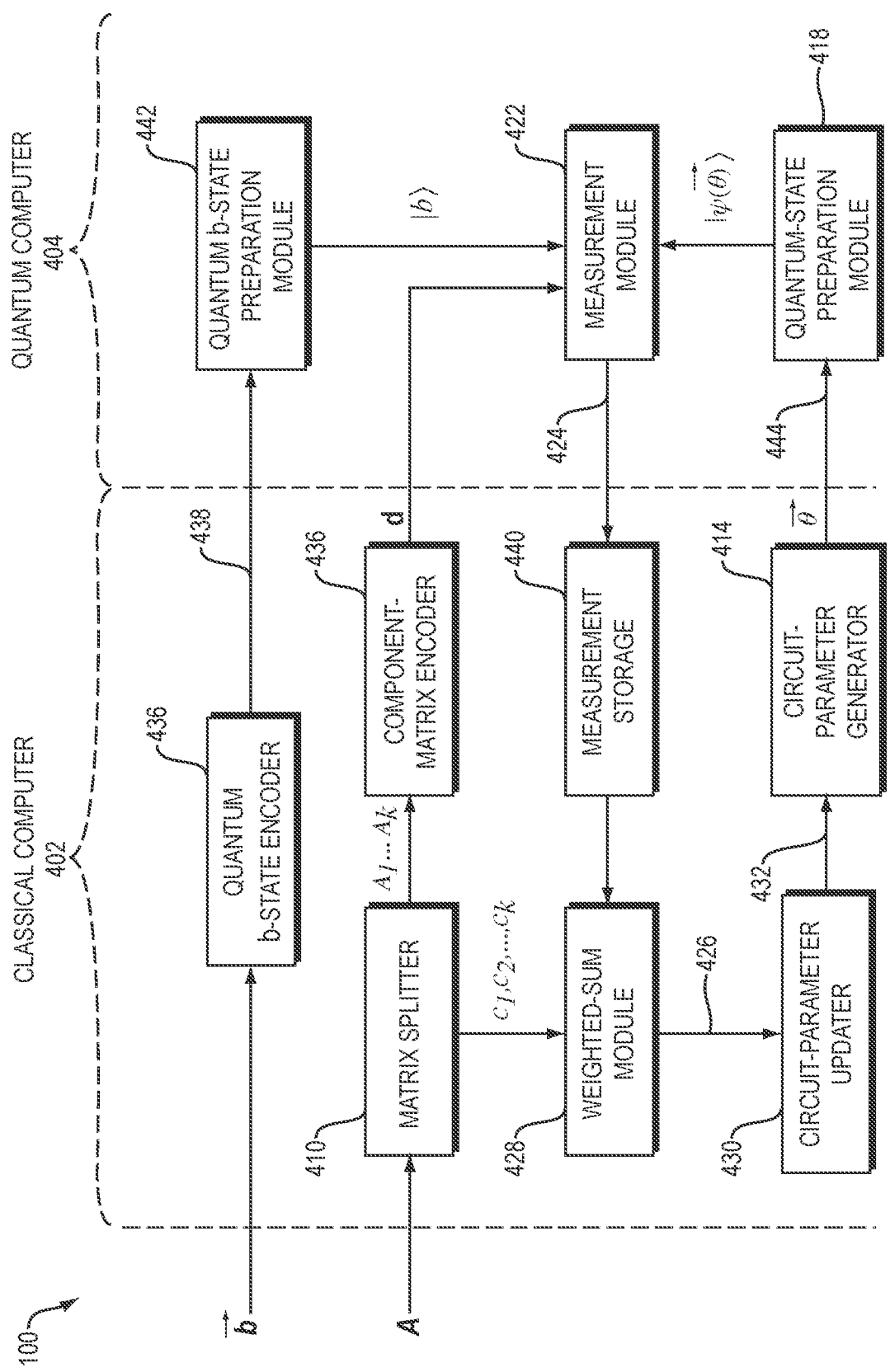
FIG. 4 shows a hybrid quantum-classical (HQC) computer system implemented according to one embodiment of the present invention.

More specifically, referring to FIG. 4, a HQC computer system 400 implemented according to one embodiment of the present invention is shown. The HQC computer system 400 includes both a classical computer 402 and a quantum computer 404. The classical computer 402 receives as input a matrix A and a vector $\vec{b}$, where the vector $\vec{x}$ is the solution to the linear system $A\vec{x}=\vec{b}$.

The classical computer 402 includes a matrix splitter 410 that determines a set of component matrices $A_1 \ldots A_k$ and a set of weights $c_1, c_2 \ldots c_k$ such that the matrix A is expressible as the linear combination $A=c_1 A_1 + c_2 A_2 \ldots c_k A_k$. The matrix A represents any n-qubit operator, while each of the component matrices $A_1 \ldots A_k$ represents an n-qubit operator that can be efficiently prepared and measured on the quantum computer 404. The number of terms k in the linear combination typically scales no more than polynomially in n. Each of the component matrices $A_1 \ldots A_k$ is stored in a memory of the classical computer 402, although not necessarily simultaneously. Well-known techniques may be used to store the component matrices $A_1 \ldots A_k$ economically.

Each of the component matrices $A_1 \ldots A_k$ in the linear combination is expressible as a tensor product of Pauli matrices:

$$A = \sum_{i=1}^{k} c_i A_i = \sum_{i=1}^{k} c_i (\sigma^{(d_{1,i})} \otimes \sigma^{(d_{2,i})} \otimes \ldots \otimes \sigma^{(d_{n,i})}), \quad (3)$$

where each single-qubit operator $\sigma^{(x)}$ is either a Pauli matrix acting on one qubit in the direction d (i.e., the x, y, or z direction) or the identity matrix acting only on the one qubit (i.e., the two-dimensional subspace spanned by the one qubit). Each term of the summand in Eqn. 3 may be referred to herein as a "Pauli string", i.e., a tensor-product of n single-qubit Pauli operators corresponding to the n qubits on which the corresponding component matrix $A_i$ operates. Associated with the Pauli string for each component matrix is an n-length direction array $d_i = (d_{i,1}, d_{i,2}, \ldots, d_{i,n})$.

Inserting Eqn. 3 into Eqn. 2 yields $$\vec{\theta}^* = \operatorname{argmin}_{\vec{\theta}} [f(\vec{\theta})] \quad (4)$$
$$= \operatorname{argmin}_{\vec{\theta}} \left[ \sum_{i=1}^{k} \sum_{j=1}^{k} \langle \psi(\vec{\theta}) | A_i^\dagger A_j | \psi(\vec{\theta}) \rangle - \sum_{i=1}^{k} 2 \operatorname{Re} \langle b | A_i | \psi(\vec{\theta}) \rangle \right].$$

where the objective function $f(\vec{\theta})$ includes a double sum over terms of the form $\langle \psi(\vec{\theta}) | A_i^\dagger A_j | \psi(\vec{\theta}) \rangle$, each of which may be referred to herein as an "expectation-value term" since it is equivalent to the expectation value of a composite matrix $A_i^\dagger A_j$ measured with respect to the quantum state $|\psi(\vec{\theta})\rangle$. The objective function $f(\vec{\theta})$ also includes a sum over terms of the form $\operatorname{Re}\langle b | A_i | \psi(\vec{\theta}) \rangle$, each of which may be referred to herein as an "overlap term" since it is equivalent to the real part of the overlap of the quantum states $|b\rangle$ and $A_i | \psi(\vec{\theta}) \rangle$.

The classical computer 402 also includes a component-matrix encoder 436 that outputs a direction array d based on one or more of the component matrices $A_1 \ldots A_k$. When the quantum computer 404 is instructed to measure a sample for an expectation-value term $\langle \psi(\vec{\theta}) | A_i^\dagger A_j | \psi(\vec{\theta}) \rangle$, the component-matrix encoder 436 combines the direction arrays $d_i$ and $d_j$ for the component matrices $A_i$ and $A_j$, respectively, into a composite direction array $d_c$. Specifically, the two component matrices $A_i$ and $A_j$, when combined into the composite matrix $A_i^\dagger A_j$, can be represented by a composite operator string $$((\sigma^{(d1,i)})^\dagger \sigma^{(d1,j)}) \otimes ((\sigma^{(d2,i)})^\dagger \sigma^{(d2,j)}) \otimes \ldots \otimes ((\sigma^{(dk,i)})^\dagger \sigma^{(dk,j)}), \quad (5)$$

where each product of the form $(\sigma^{x_1})^\dagger \sigma^{x_2}$ can be simplified to one single-qubit operator (i.e., either the identity operator or a Pauli matrix). For example, $(\sigma^y)^\dagger \sigma^x = -\sigma_y \sigma_x = i\sigma_z$. Thus, the composite direction array $d_c$ is associated with the composite operator string of Eqn. 5, similar to how the direction arrays $d_i$ and $d_j$ are associated with the operator strings representing the component matrices $A_i$ and $A_j$, respectively.

Advantageously, the component-matrix encoder 436 can determine the composite direction array $d_c$ using only the direction arrays $d_i$ and $d_j$, and without explicitly determining the composite matrix $A_i^\dagger A_j$ or the composite operator string of Eqn. 5. The component-matrix encoder 436 outputs the composite direction array $d_c$ to the quantum computer 404. More details about how the quantum computer 404 uses a composite direction array to measure a sample for an expectation-value term are presented below.

When the quantum computer 404 is instructed to measure a sample for an overlap term $\langle b | A_i | \psi(\vec{\theta}) \rangle$, the component-matrix encoder 436 outputs to the quantum computer 404 the direction array $d_i$ for the composite matrix $A_i$. More details about how the quantum computer 404 uses a direction array to measure a sample for an overlap term are presented below.

The classical computer 402 also includes a circuit-parameter generator 414 that outputs one or more control signals 444 corresponding to a set of circuit parameters $\vec{\theta}$. The quantum computer 404 also includes a quantum-state preparation module 418 that prepares an n-qubit quantum state $|\psi(\vec{\theta})\rangle$ based on the control signals 444.

The classical computer 402 also includes a quantum b-state encoder 436 that outputs one or more control signals 438 to the quantum computer 404 to prepare an n-qubit quantum b-state $|b\rangle$ that encodes the vector $\vec{b}$. The quantum computer 404 also includes a quantum b-state preparation module 442 that prepares the quantum b-state $|b\rangle$ based on the control signals 438.

The quantum computer 404 includes a measurement module 422 that processes and measures the quantum state $|\psi(\vec{\theta})\rangle$, according to a direction array d received from the component-matrix encoder 436, to obtain one measured sample of either an expectation-value term $\langle \psi(\vec{\theta}) | A_i^\dagger A_j | \psi(\vec{\theta}) \rangle$ or an overlap term $\langle b | A_i | \psi(\vec{\theta}) \rangle$. Operation of the measurement module 422 depends on which of these two terms is being measured, as described in more detail below. Since the quantum b-state $|b\rangle$ is not used to obtain samples of expectation-value terms, the quantum b-state preparation module 442 need not be implemented for these measurements.

Figure 5:
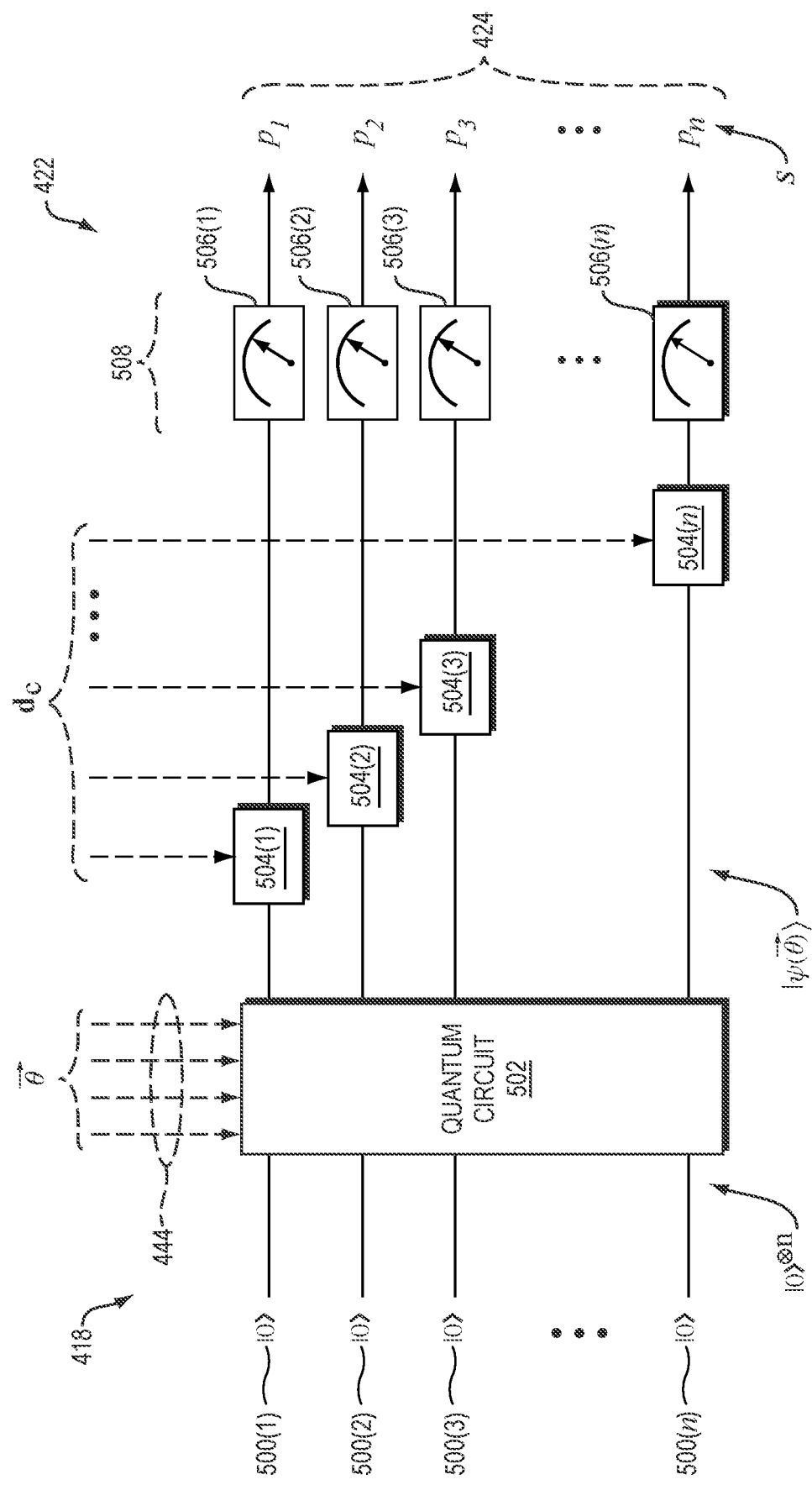
FIG. 5 is a quantum circuit diagram illustrating one example of operation of a quantum computer of the HQC computer system of FIG. 4, in an embodiment.

FIG. 5 is a quantum circuit diagram illustrating one example of operation of the quantum computer 404 of FIG. 4. In FIG. 5, the measurement module 422 includes an array 508 of n single-qubit detectors 506 that measure n qubits 500. The measurement module 422 then outputs the measured values as a measured sample 424 of the expectation-value term $\langle \psi(\vec{\theta}) | A_i^\dagger A_j | \psi(\vec{\theta}) \rangle$. Each single-qubit detector 506 measures a corresponding one of the qubits 500 along a direction indicated by a corresponding element of a composite direction array $d_c$ such that the composite matrix $A_i^\dagger A_j$ acts on the quantum state $|\psi(\vec{\theta})\rangle$.

In FIG. 5, the quantum-state preparation module 418 includes a parameterized quantum circuit 502 that physically drives the qubits 500, according to the one or more control signals 444, to transform the qubits 500 from a reference state $|0\rangle^{\otimes n}$ to the quantum state $|\psi(\vec{\theta})\rangle$. In some embodiments, the parameterized quantum circuit 502 implements an alternating operator ansatz. In other embodiments, the parameterized quantum circuit 502 implements a unitary coupled-cluster ansatz of a certain level of excitation. A Moller-Plesset perturbation theory approximation method may be used to generate an initial assignment for the circuit parameters $\vec{\theta}$.

Although not shown in FIG. 5, the quantum-state preparation module 418 may additionally drive the qubits 500, prior to the parameterized quantum circuit 502, to initialize the qubits 500 into the reference state $|0\rangle^{\otimes n}$. For example, the initialization may use a mean-field approximation based on self-consistent iterations. The mean-field approximation may be a Hartree-Fock approximation. The quantum-state preparation module 418 may alternatively use another initialization method without departing from the scope hereof. In addition, a quantum state other than $|0\rangle^{\otimes n}$ may be used for the reference state.

In embodiments where the single-qubit detectors 506 are configured to measure the qubits 500 along a fixed direction (e.g., the z direction) that is not controllable, the quantum computer 404 may include a plurality of gates 504 that rotate the qubits 500 according to the elements of the direction array d. Each gate 504 rotates the corresponding qubit 500 such that the measurement of the qubit 500 along the fixed direction is equivalent to a measurement along a different direction (e.g., the x or y direction). For example, in a Bloch-sphere representation, the combination of a π/2 rotation about the y axis and a measurement along the z axis is equivalent to a measurement along the x axis. When the element of the direction array d indicates that a qubit 500 should be measured along the fixed direction, then the corresponding gate 504 is not needed (e.g., the corresponding gate 504 is configured to implement an identity matrix that leaves the qubit 500 unchanged).

Each single-qubit detector 506, in response to measuring its corresponding qubit 500, returns a value $p_i$ (i=1 to n) that is equal to either +1 or −1. Thus, the array 508 of single-qubit detectors 506 outputs n such values that collectively form a measured bit-string $s=(p_1, p_2, \ldots p_n)$. In some embodiments, the measurement module 422 outputs the measured bit-string s to the classical computer 402 as a measured sample 424. A measurement storage 440 of the classical computer 402 then stores the measured sample 424. In some embodiments, the measurement storage 440 additionally multiplies the bits of the bit-string s together to obtain a single product $p_s = \Pi_{i=1}^n p_i$ whose value is either +1 or −1. To reduce storage requirements, the measurement storage 440 may discard the bit-string s and store just the product $p_s$ obtained therefrom. In other embodiments, the measurement module 422 calculates the product $p_s$ from the bit-string s, and outputs only the product $p_s$ as the measured sample 424.

While FIG. 5 shows the quantum-state preparation module 418 operating with a parameterized quantum circuit 502, the quantum-state preparation module 418 may alternatively prepare the quantum state $|\psi(\vec{\theta})\rangle$ using another quantum-state preparation technique known in the art. For example, the quantum-state preparation module 418 may include a quantum-annealing circuit that adiabatically drives the qubits 500, according to a time-dependent Hamiltonian and an annealing schedule, to anneal the reference state $|0\rangle^{\otimes n}$ into the quantum state $|\psi(\vec{\theta})\rangle$. Alternatively, the quantum-state preparation module 418 may include a nearest-neighbor matchgate circuit that acts on a one-dimension chain of qubits 500, wherein the quantum state $|\psi(\vec{\theta})\rangle$ represents a fermionic Gaussian state that can be efficiently obtained using a classical approximation.

Figure 6:
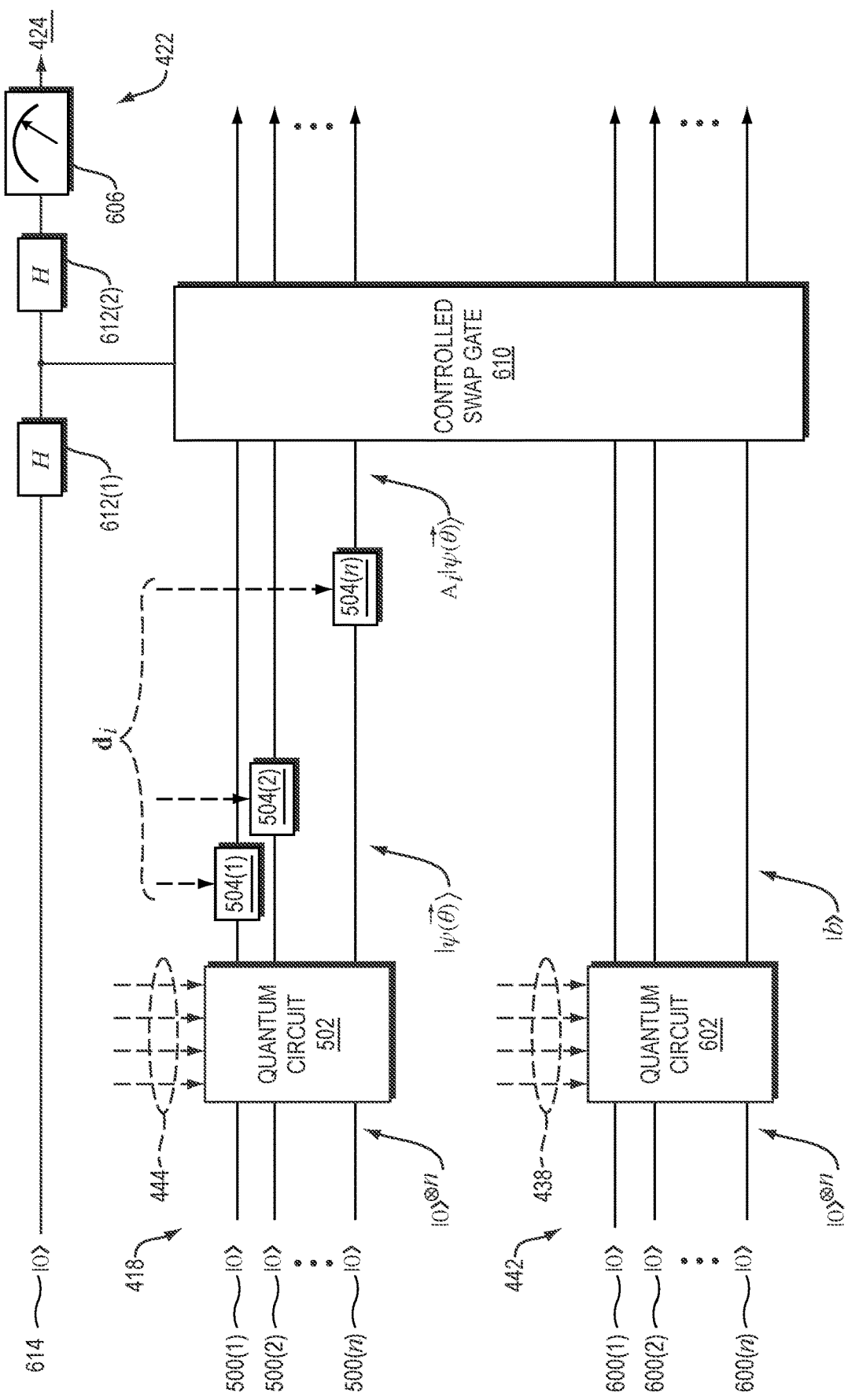
FIG. 6 is a quantum circuit diagram illustrating another example of operation of the quantum computer of the HQC computer system of FIG. 4, in an embodiment.

FIG. 6 is a quantum circuit diagram illustrating another example of operation of the quantum computer 404 of FIG. 4. In FIG. 6, the measurement module 422 includes one single-qubit detector 606 that measures an ancillary qubit 614 as part of a quantum SWAP test. The measurement module 422 then outputs the measured value of the ancillary qubit 614 as a measured sample 424 of the overlap term $\langle b|A_i|\psi(\vec{\theta})\rangle$.

In FIG. 6, a quantum b-state preparation module 442 includes a parameterized quantum circuit 602 that physically drives n qubits 600, according to the one or more control signals 438, to transform the qubits 600 from a reference state $|0\rangle^{\otimes n}$ to the quantum b-state $|b\rangle$. Although not shown in FIG. 6, the quantum b-state preparation module 442 may additionally drive the qubits 600, prior to the parameterized quantum circuit 602, to initialize the qubits into the reference state $|0\rangle^{\otimes n}$. The quantum-state preparation module 418 may use any initialization method known in the art. A quantum state other than $|0\rangle^{\otimes n}$ may be used for the reference state.

FIG. 6 also shows the parameterized quantum circuit 502 transforming the n qubits 500 from the reference state $|0\rangle^{\otimes n}$ to the quantum state $|\psi(\vec{\theta})\rangle$, as described above for FIG. 5. The gates 504 are driven, based on the elements of a direction array $d_i$ for a components matrix $A_i$, such that the gates 504 transform the qubits 500 from the quantum state $|\psi(\vec{\theta})\rangle$ into a transformed state $A_i|\psi(\vec{\theta})\rangle$.

To measure one sample of the overlap term $\langle b|A_i|\psi(\vec{\theta})\rangle$, the measurement module 422 implements a quantum SWAP test by using a first Hadamard gate 612(1) to transform the ancillary qubit 614 from an initial state $|0\rangle$ to a superposition state. A controlled-SWAP gate is then applied to the ancillary qubit 614 (in the superposition state), the qubits 500 (in the quantum state $A_i|\psi(\vec{\theta})\rangle$), and the qubits 600 (in the quantum b-state $|b\rangle$). Afterward, a second Hadamard gate 612(2) is applied to the ancillary qubit 614, and the ancillary qubit 614 is measured with the single-qubit detector 606. The resulting value of +1 or −1 is then outputted to the measurement storage 440 as the measured sample 424. Note that the qubits 500 and the qubits 600 do not need to be measured as part of the quantum SWAP test.

While FIG. 6 shows the quantum b-state preparation module 442 operating with a parameterized quantum circuit 602, the quantum b-state preparation module 442 may alternatively prepare the quantum b-state $|b\rangle$ using another quantum-state preparation technique known in the art. For example, the quantum b-state preparation module 442 may include a quantum-annealing circuit that adiabatically drives the qubits 600, according to a time-dependent Hamiltonian and an annealing schedule, to anneal the reference state $|0\rangle$ $\rangle^{\otimes n}$ into the quantum b-state $|b\rangle$. Alternatively, the quantum b-state preparation module 442 may include a nearest-neighbor matchgate circuit that acts on a one-dimension chain of qubits 600, wherein the quantum state $|b\rangle$ represents a fermionic Gaussian state that can be efficiently obtained using a classical approximation.

Since each measurement for an expectation-value term destroys the quantum state $|\psi(\vec{\theta})\rangle$, the quantum-state preparation module 418 and measurement module 422 may repeatedly prepare and measure the quantum state $|\psi(\vec{\theta})\rangle$ to obtain a plurality of independent measured samples for one expectation-value term $\langle\psi(\vec{\theta})|A_i^\dagger A_j|\psi(\vec{\theta})\rangle$. The measurement storage 440 may process the plurality of measured samples to obtain an estimate for the one expectation-value term with reduced uncertainty. For example, the measurement storage 440 may average the measured samples to obtain an average that estimates the one expectation-value term with a value between −1 and +1. For each of these measured samples, the quantum-state preparation module 418 prepares the quantum state $|\psi(\vec{\theta})\rangle$ with the same set of circuit parameters $\vec{\theta}$, and the measurement module 422 measures the n qubits using the same direction vector d.

Similarly, the quantum-state preparation module 418, b-state preparation module 442, and measurement module 422 may repeatedly prepare the quantum state $|\psi(\vec{\theta})\rangle$, prepare the quantum b-state $|b\rangle$, and initialize the ancillary qubit 614 to repeat the quantum SWAP test, thereby obtaining a plurality of independent measured samples for one overlap term $\langle b|A_i|\psi(\vec{\theta})\rangle$. The measurement storage 440 may process the plurality of measured samples to obtain an estimate for the one overlap term with reduced uncertainty. For example, the measurement storage 440 may average the measured samples to obtain an average for the one overlap term. For each of these measured samples, the quantum-state preparation module 418 prepares the quantum state $|\psi(\vec{\theta})\rangle$ with the same set of circuit parameters $\vec{\theta}$, and the measurement module 422 transforms the n qubits 500 of the quantum state $|\psi(\vec{\theta})\rangle$ using the same direction vector d.

While FIG. 6 shows how an overlap term can be measured using a quantum SWAP test, another technique for measuring the overlap between the quantum state $|\psi(\vec{\theta})\rangle$ and the quantum b-state $|b\rangle$ may be used without departing from the scope hereof.

The quantum computer 404 may also be repeatedly operated with different direction arrays to obtain one average for each of the $k^2$ expectation-value terms, and one average for each of the k overlap terms. All of these averages may be processed and stored in the measurement storage 440 based on the measured samples 424 received from the measurement module 422.

Referring to FIG. 4, the classical computer 402 also includes a weighted-sum module 428 that calculates and outputs an estimate 426 for the objective function $f(\vec{\theta})$ based on (i) the average of each expectation-value term, (ii) the average of each overlap term, and (iii) the weights $c_1$, $c_2 \ldots c_k$ determined by the matrix splitter 410. Specifically, the weighted-sum module 428 combines the averages and weights according to the objective function $f(\vec{\theta})$ (e.g., see Eqn. 3).

The classical computer 402 also includes a circuit-parameter updater 430 that implements a classical optimization algorithm on the estimate 428 to identify updated circuit parameters $\vec{\theta}'$ such that an updated quantum state $|\psi(\vec{\theta}')\rangle$ is closer to the solution $\vec{x}$ of the linear system than the quantum state $|\psi(\vec{\theta})\rangle$. The circuit-parameter updater 430 may store several estimates of the objective function $f(\vec{\theta})$ for several corresponding values of the circuit parameters $\vec{\theta}$, wherein the circuit-parameter updater 430 uses the several estimates and the several corresponding values of the circuit parameters $\vec{\theta}$ to determine how to update the circuit parameters $\vec{\theta}$. For example, the circuit-parameter updater 430 may implement a gradient-descent algorithm that identifies a negative gradient of the objective function $f(\vec{\theta})$, wherein the circuit-parameter updater 430 updates the circuit parameters $\vec{\theta}$ by stepping along the negative gradient. Other classical optimization algorithms may be used without departing from the scope hereof.

The circuit-parameter updater 430 outputs an updater output 432 to the circuit-parameter generator 414, which uses the updater output 432 to control the quantum-state preparation module 418 according to the updated circuit parameters $\vec{\theta}'$. The quantum-state preparation module 418 then prepares the updated quantum state $|\psi(\vec{\theta}')\rangle$.

The above operation of the HQC computer system 400 may be repeated one or more times to obtain iteratively-updated circuit parameters such that the estimate of the objective function converges to an optimum (i.e., a maximum or a minimum). Upon convergence (i.e., when the updated estimates of the objective function change by less than a threshold), an optimized set of parameters $\vec{\theta}^*$ is obtained, and the quantum state $|\psi(\vec{\theta})\rangle$, as prepared by the quantum-state preparation module 418 according to the optimized parameters $\vec{\theta}^*$, approximates the true solution $\vec{x}$ of the linear system.

Figure 7:
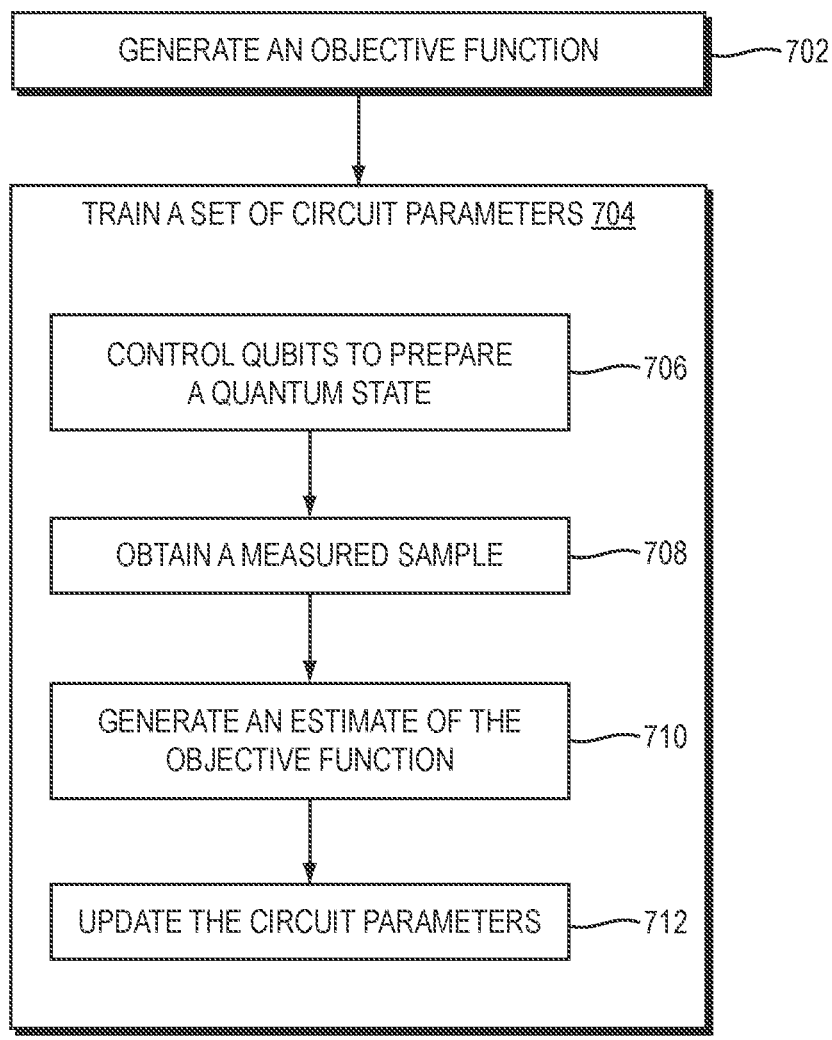
FIG. 7 is a flow chart illustrating a method for preparing a quantum state that approximates a solution x to a linear system of equations $A\vec{x}=\vec{b}$ for a matrix A and a vector $\vec{b}$, in embodiments.

FIG. 7 is a flow chart illustrating a method 700 for preparing a quantum state that approximates a solution x to a linear system of equations $A\vec{x}=\vec{b}$ for a matrix A and a vector $\vec{b}$. Method 700 may be implemented, for example, with the HQC computer system 400 of FIG. 4.

In a block 702 of method 700, an objective function is generated on a classical computer. The objective function depends on (1) at least one expectation-value term derivable from the matrix A, and (2) at least one overlap term derivable from the vector b and the matrix A, such that an optimal assignment of the objective function corresponds to an approximate solution of the linear system. In one example of block 702, the objective function $f(\vec{\theta})$ depends on expectation-value terms $\langle\psi(\vec{\theta})|A_i^\dagger A_j|\psi\vec{\theta}\rangle$ and overlap terms $\text{Re}\langle b|A_i|\psi(\vec{\theta})\rangle$ (see Eqn. 4)

In a block 704 of method 700, a set of circuit parameters $\vec{\theta}$ are trained. Block 704 includes a sub-block 706 in which a plurality of qubits is controlled, on a quantum computer, according to the set of circuit parameters $\vec{\theta}$, to prepare a quantum state $|\psi(\vec{\theta})\rangle$. In one example of the sub-block 4706, the parameterized quantum circuit 502 of FIG. 5 transforms the qubits 500 from the reference state $|0\rangle^{\otimes n}$ to the quantum state $|\psi(\vec{\theta})\rangle$ using control signals 444 based on the circuit parameters $\vec{\theta}$.

Block 704 also includes a sub-block 708 in which a measured sample is obtained from the quantum computer. The measured sample is one of: (i) a bit-string of binary values obtained by measuring the plurality of qubits according to a Pauli string derived from the matrix A, and (ii) a measurement of overlap between the quantum state $|\psi(\vec{\theta})\rangle$ and a quantum b-state $|b\rangle$ that encodes the vector $\vec{b}$ on the quantum computer. In one example of the sub-block 708, the measurement module 422 includes an array 508 of single-qubit detectors 506 that measure the qubits 500 to obtain a bit-string s (see FIG. 5). In another example of the sub-block 708, the measurement module 422 implements a quantum SWAP test (see FIG. 6).

Block 704 also includes a sub-block 710 in which an estimate of the objective function is generated based on the measured sample. In one example of the sub-block 710, the weighted-sum module 428 of the classical computer 402 calculates an estimate 426 of the objective function $f(\vec{\theta})$.

Block 704 also includes a sub-block 7412 in which the circuit parameters $\vec{\theta}$ are updated, based on the estimate of the objective function, to optimize a subsequent estimate of the objective function. In one example of the sub-block 712, the circuit-parameter updater 430 outputs the updater output 432 to the circuit-parameter generator 414 to generate the updated circuit parameters $\vec{\theta}'$.

In some embodiments, the block 704 is iterated until the estimate of the objective function satisfies a convergence criterion. If the estimate of the objective function does not satisfy the convergence criterion, then block 704 is repeated. If the estimate of the objective function satisfies the convergence criterion, then method 700 stops.

Embodiments herein may be applied to problems in quantum chemistry, such as inverse iteration to approximate the ground state $|g\rangle$ of a quantum system of interest. The quantum system may be described by a Hamiltonian H that, like A, can be represented as a matrix. A sequence of t trial states $|\psi_1\rangle, |\psi_2\rangle, \ldots, |\psi_t\rangle$ can be generated from an initial trial state $|\psi_0\rangle$ that has significant overlap with the ground state $|g\rangle$. Each trial state $|\psi_{i+1}\rangle$ of the sequence is a solution to the linear system $H|\psi_{i+1}\rangle = |\psi_i\rangle$, and thus can be determined using embodiments herein. If the ground state $|g\rangle$ is separated in energy from a lowest-energy excited state $|e\rangle$ by a gap $\delta$, then the sequence of trial states corresponds to a sequence of overlaps with the excited state $|e\rangle$, i.e., $\langle e|\psi_1\rangle, \langle e|\psi_2\rangle, \ldots, \langle e|\psi_t\rangle$. The sequence of overlaps decreases by $O(\delta^{-t})$, and thus the trial states converge similarly to the ground state $|g\rangle$. When the Hamiltonian H represents the electronic structure of a molecular species, the Hamiltonian H can be decomposed into $O(N^4)$ terms, each of which is a Pauli string. In this case, evaluating the objecting function $f(\vec{\theta})$ requires resources that scale polynomially with a size of the input.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere (as is well-known to those having ordinary skill in the art, the Bloch sphere is a geometrical representation of the space of pure states of a qubit). Multi-qubit gates alter the quantum state of a set of qubits. For example, two-qubit gates rotate the state of two qubits as a rotation in the four-dimensional Hilbert space of the two qubits (as is well-known to those having ordinary skill in the art, a Hilbert space is an abstract vector space possessing the structure of an inner product that allows length and angle to be measured). Furthermore, Hilbert spaces are complete: there are enough limits in the space to allow the techniques of calculus to be used.

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
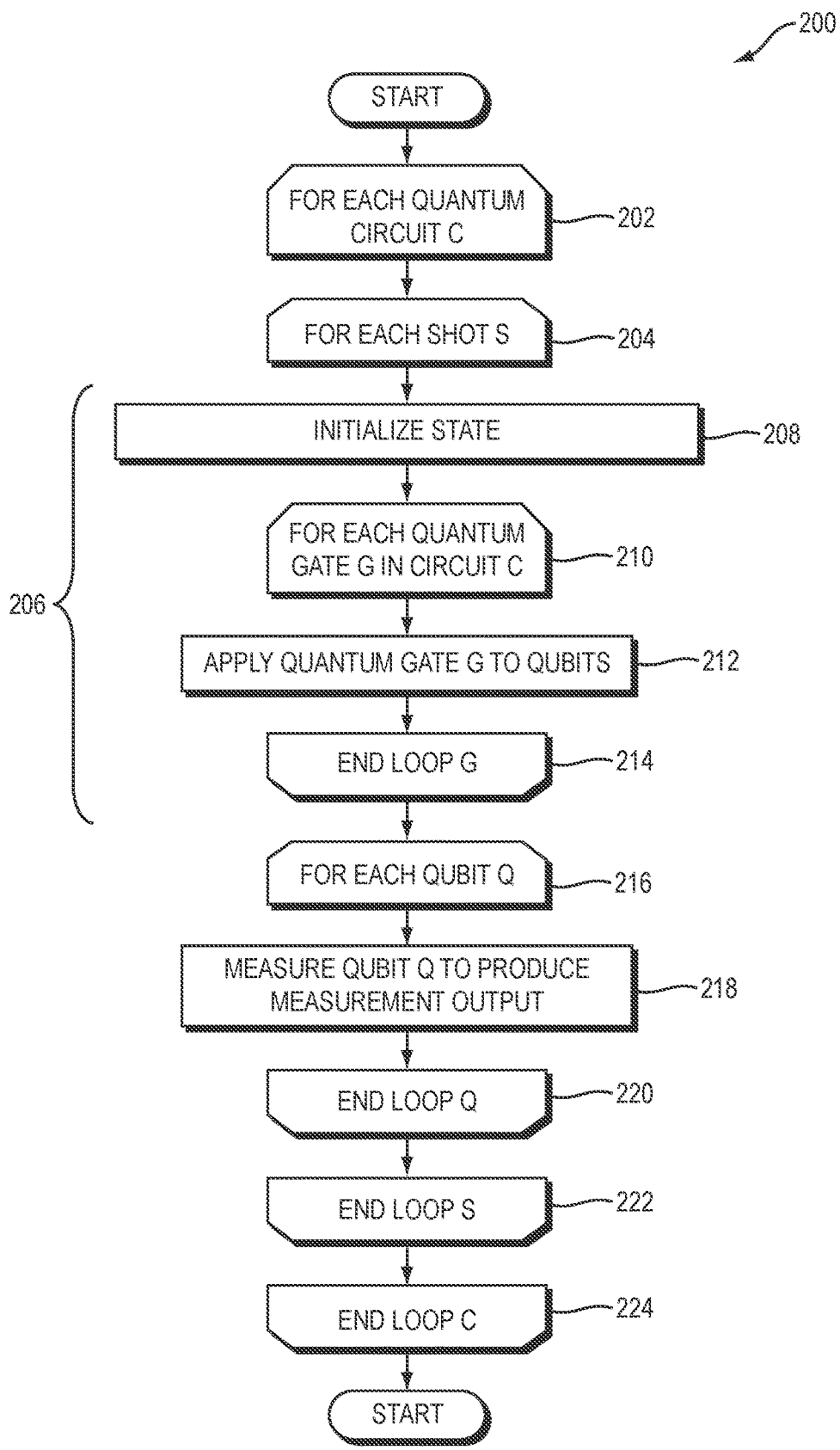
FIG. 2A shows a flow chart of a method performed by the system of FIG. 1 according to one embodiment of the present invention.
Figure 2B:
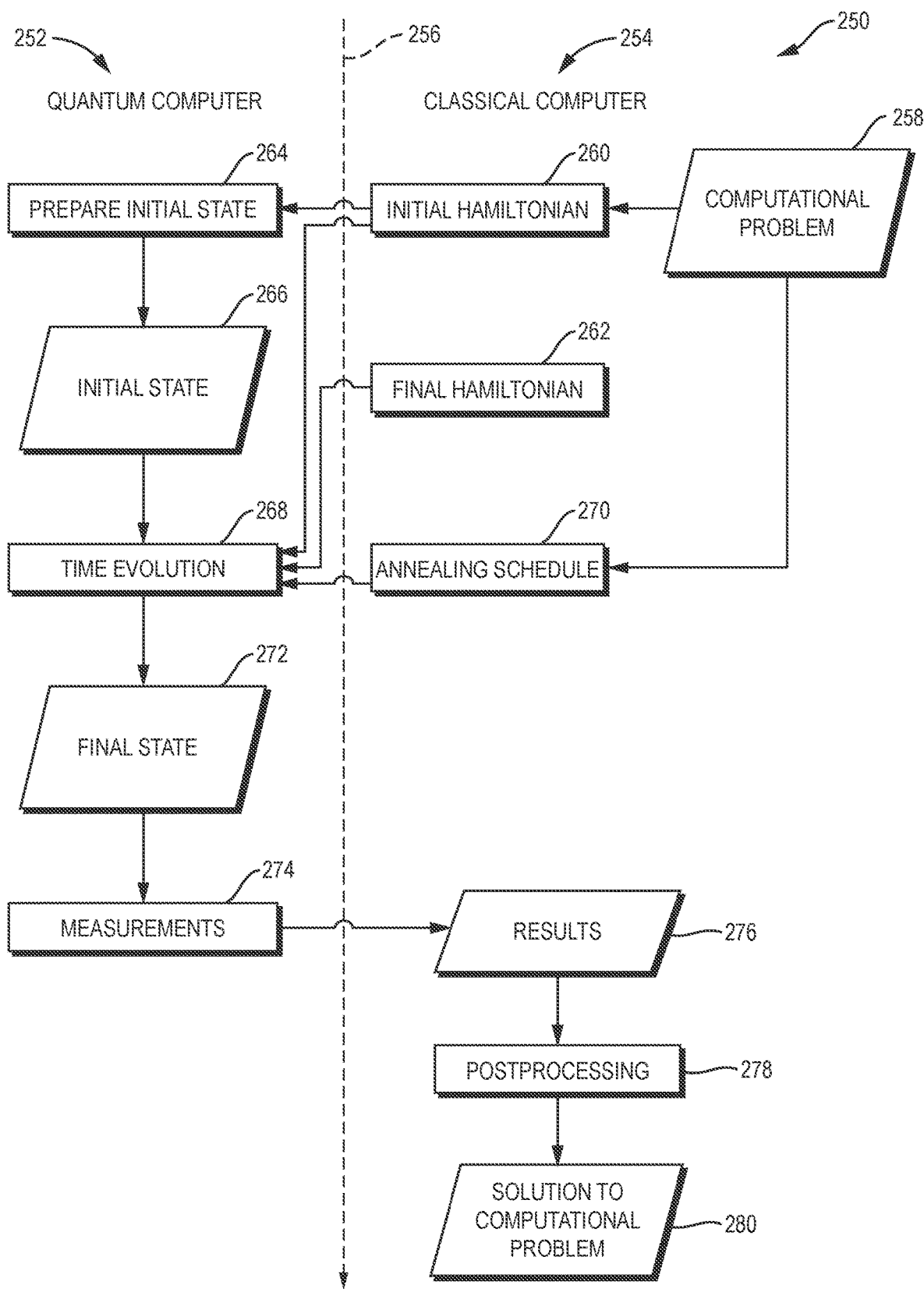
FIG. 2B shows a diagram illustrating operations typically performed by a computer system which implements quantum annealing.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem 258. An experimental demonstration of the success of quantum annealing for random magnets was reported immediately after the initial theoretical proposal.

The final state 272 of the quantum computer 254 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general, the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flow chart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 104. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:
In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback 114 from the measurement unit 110 to the control unit 106. Such feedback 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, operation 206). A special case of state preparation is "initialization," also referred to as a "reset operation," in which the initial state is one in which some or all of the qubits 104 are in the "zero" state i.e. the default single-qubit state (FIG. 2, operation 208). More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A as elements of "state preparation" may instead be characterized as elements of gate application. Conversely, for example, some or all of the components and operations that are illustrated in FIGS. 1 and 2A as elements of "gate application" may instead be characterized as elements of state preparation. As one particular example, the system and method of FIGS. 1 and 2A may be characterized as solely performing state preparation followed by measurement, without any gate application, where the elements that are described herein as being part of gate application are instead considered to be part of state preparation. Conversely, for example, the system and method of FIGS. 1 and 2A may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
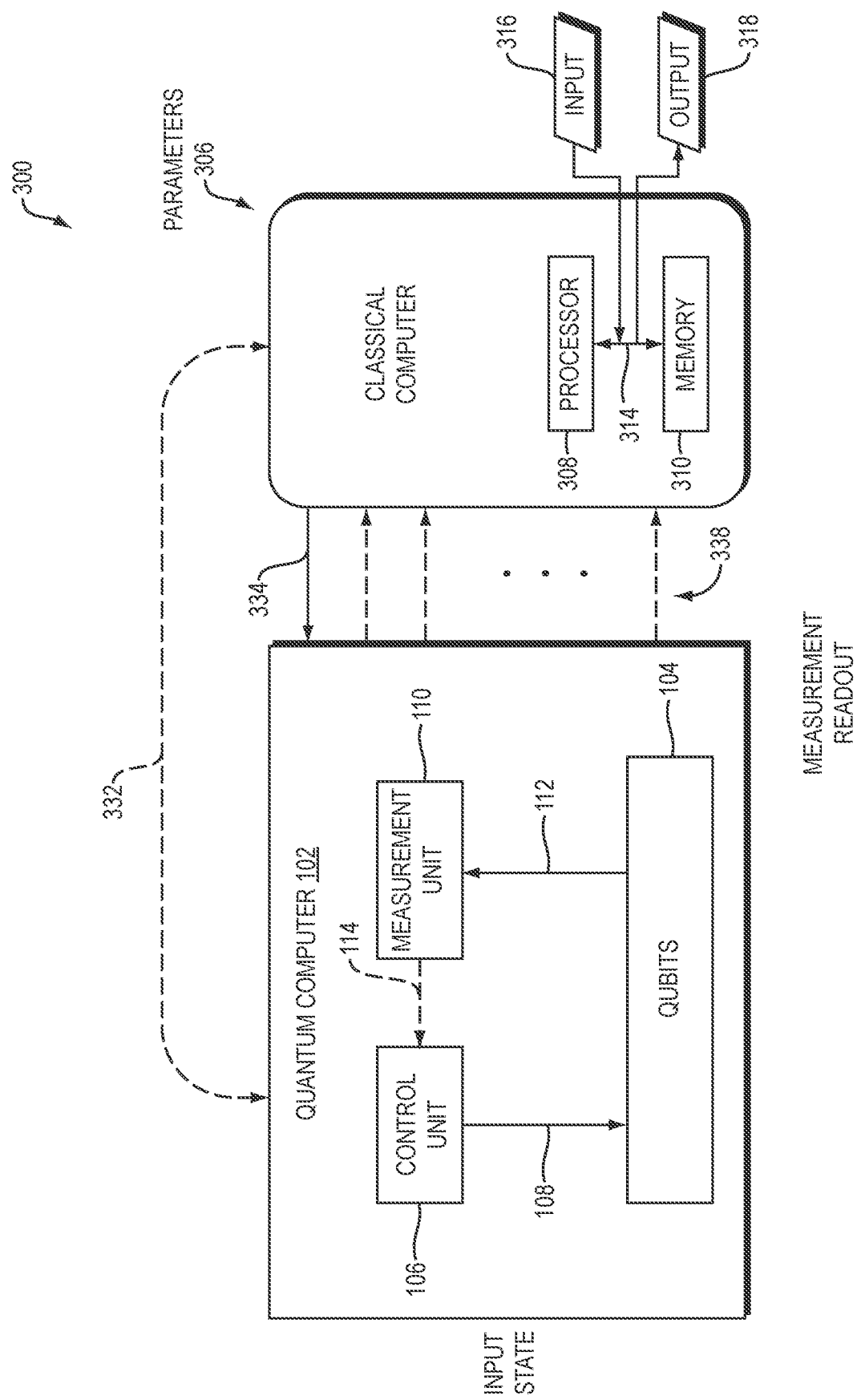
FIG. 3 shows a diagram of a HQC computer system implemented according to one embodiment of the present invention.

Referring to FIG. 3, a diagram is shown of a HQC computer system 300 implemented according to one embodiment of the present invention. The HQC computer system 300 includes a quantum computer component 102 (which may, for example, be implemented in the manner shown and described in connection with FIG. 1) and a classical computer component 306. The classical computer component may be a machine implemented according to the general computing model established by John von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a HQC computer system. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC computer system) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the splittings described herein are solved by a quantum computer that performs quantum operations on quantum states. For moderately large systems (e.g., at least 50 qubits) these features would be infeasible or impossible to perform manually or even using a classical computer.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random-access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method for preparing a quantum state that approximates a solution x to a linear system of equations $A\vec{x}=\vec{b}$ for a matrix A and a vector $\vec{b}$, comprising:
   (a) on a classical computer, generating an objective function that depends on: (1) at least one expectation-value term derivable from the matrix A, and (2) at least one overlap term derivable from the vector $\vec{b}$ and the matrix A; and
   (b) training a set of circuit parameters $\vec{\theta}$, comprising:
      (1) on a quantum computer, controlling a plurality of qubits, according to the set of circuit parameters $\vec{\theta}$, to prepare a quantum state $|\psi(\vec{\theta})\rangle$;
      (2) on the quantum computer, obtaining a measured sample, the measured sample being one of: (i) a bit-string of binary values obtained by measuring the plurality of qubits according to a Pauli string derived from the matrix A, and (ii) a measurement of overlap between the quantum state $|\psi(\vec{\theta})\rangle$ and a quantum b-state |b) that encodes the vector $\vec{b}$ on the quantum computer;
      (3) on the classical computer, generating an estimate of the objective function based on the measured sample; and
      (4) on the classical computer, updating the circuit parameters $\vec{\theta}$, based on the estimate of the objective function, to optimize a subsequent estimate of the objective function.

2. The method of claim 1, wherein (b) further comprises:
   (5) on the classical computer, determining whether the estimate of the objective function satisfies a convergence criterion; and
   (6) returning to (b) (1) if the estimate of the objective function does not satisfy the convergence criterion.

3. The method of claim 1, wherein (b) (1) comprises:
   (a) initiating the plurality of qubits to prepare a reference state; and
   (b) driving the plurality of qubits according to a parameterized quantum circuit to transform the reference state into the quantum state $|\psi(\vec{\theta})\rangle$.

4. The method of claim 3, wherein (b)(1)(a) comprises using a mean-field approximation based on self-consistent iterations.

5. The method of claim 4, wherein the mean-field approximation comprises a Hartree-Fock approximation.

6. The method of claim 3, wherein the parameterized quantum circuit comprises an alternating operator ansatz.

7. The method of claim 3, wherein the parameterized quantum circuit implements a unitary coupled-cluster ansatz of a certain level of excitation.

8. The method of claim 7, further comprising using a Moller-Plesset perturbation theory approximation method to generate an initial assignment for the set of circuit parameters $\vec{\theta}$.

9. The method of claim 1, wherein (b)(1) comprises:
   (i) initiating the plurality of qubits to prepare a reference state; and
   (ii) driving the plurality of qubits according to a tunable annealing schedule to transform the reference state into the quantum state $|\psi(\vec{\theta})\rangle$.

10. The method of claim 1, wherein preparing the quantum state $|\psi(\vec{\theta})\rangle$ in (b)(1) comprises using a nearest-neighbor matchgate circuit acting on a one-dimensional qubit chain, wherein the state $|\psi(\vec{\theta})\rangle$ represents a fermionic Gaussian state.

11. The method of claim 1, wherein the objective function comprises $\langle\psi(\vec{\theta})|A^\dagger A|\psi(\vec{\theta})\rangle - 2\text{Re}\langle b|A|\psi(\vec{\theta})\rangle$.

12. The method of claim 1, wherein the objective function comprises $\langle\psi(\vec{\theta})|A|\psi(\vec{\theta})\rangle/2 - \langle\psi(\vec{\theta})|b\rangle$.

13. The method of claim 1, further comprising splitting the matrix A into a linear combination of component matrices, each representable by a Pauli string.

14. The method of claim 1, wherein the matrix A is a fermionic Hamiltonian representing n spin orbitals as a sum of Pauli strings.

15. The method of claim 1, further comprising preparing the quantum b-state $|b\rangle$ on the quantum computer before obtaining the measurement of overlap.

16. A hybrid quantum-classical computing system for preparing a quantum state that approximates a solution x to a linear system of equations $A\vec{x}=\vec{b}$ for a matrix A and a vector $\vec{b}$, the hybrid quantum-classical computing system comprising:
   a quantum computing component having a plurality of qubits; and
   a classical computing component storing machine-readable instructions that, when executed by the classical computing component, control the classical computing component to cooperate with the quantum computing component to perform operations comprising:
   (a) on the classical computing component, generating an objective function that depends on: (1) at least one expectation-value term derivable from the matrix A, and
   (2) at least one overlap term derivable from the vector $\vec{b}$ and the matrix A; and
   (b) training a set of circuit parameters $\vec{\theta}$, comprising:
      (1) on the quantum computing component, controlling a plurality of qubits, according to the set of circuit parameters $\vec{\theta}$, to prepare a quantum state $|\psi(\vec{\theta})\rangle$;
      (2) on the quantum computing component, obtaining a measured sample, the measured sample being one of: (i) a bit-string of binary values obtained by measuring the plurality of qubits according to a Pauli string derived from the matrix A, and (ii) a measurement of overlap between the quantum state $|\psi(\vec{\theta})\rangle$ and a quantum b-state $|b\rangle$ that encodes the vector $\vec{b}$ on the quantum computing component;
      (3) on the classical computing component, generating an estimate of the objective function based on the measured sample; and
      (4) on the classical computing component, updating the circuit parameters $\vec{\theta}$, based on the estimate of the objective function, to optimize a subsequent estimate of the objective function.

17. The hybrid quantum-classical computing system of claim 16, wherein (b) further comprises:
   (5) on the classical computing component, determining whether the estimate of the objective function satisfies a convergence criterion; and
   (6) returning to (b)(1) if the estimate of the objective function does not satisfy the convergence criterion.

18. The hybrid quantum-classical computing system of claim 16, wherein (b)(1) comprises:
   (a) initiating the plurality of qubits to prepare a reference state; and
   (b) driving the plurality of qubits according to a parameterized quantum circuit to transform the reference state into the quantum state $|\psi(\vec{\theta})\rangle$.

19. The hybrid quantum-classical computing system of claim 18, wherein (b)(1)(a) comprises using a mean-field approximation based on self-consistent iterations.

20. The hybrid quantum-classical computing system of claim 19, wherein the mean-field approximation comprises a Hartree-Fock approximation.

21. The hybrid quantum-classical computing system of claim 18, wherein the parameterized quantum circuit comprises an alternating operator ansatz.

22. The hybrid quantum-classical computing system of claim 18, wherein the parameterized quantum circuit implements a unitary coupled-cluster ansatz of a certain level of excitation.

23. The hybrid quantum-classical computing system of claim 22, the classical computing component storing additional machine-readable instructions that control the classical computing component to cooperate with the quantum computing component to use a Moller-Plesset perturbation theory approximation method to generate an initial assignment for the set of circuit parameters $\vec{\theta}$.

24. The hybrid quantum-classical computing system of claim 16, wherein (b)(1) comprises:
   (i) initiating the plurality of qubits to prepare a reference state; and
   (ii) driving the plurality of qubits according to a tunable annealing schedule to transform the reference state into the quantum state $|\psi(\vec{\theta})\rangle$.

25. The hybrid quantum-classical computing system of claim 16, wherein preparing the quantum state $|\psi(\vec{\theta})\rangle$ in (b)(1) comprises using a nearest-neighbor matchgate circuit acting on a one-dimensional qubit chain, wherein the state $|\psi(\vec{\theta})\rangle$ represents a fermionic Gaussian state.

26. The hybrid quantum-classical computing system of claim 16, wherein the objective function comprises $\langle\psi(\vec{\theta})|A^\dagger A|\psi(\vec{\theta})\rangle - 2\text{Re}\langle b|A|\psi(\vec{\theta})\rangle$.

27. The hybrid quantum-classical computing system of claim 16, wherein the objective function comprises $\langle\psi(\vec{\theta})|A|\psi(\vec{\theta})\rangle/2 - \langle\psi(\vec{\theta})|b\rangle$.

28. The hybrid quantum-classical computing system of claim 16, the classical computing component storing additional machine-readable instructions that control the classical computing component to cooperate with the quantum computing component to split the matrix A into a linear combination of component matrices, each representable by a Pauli string.

29. The hybrid quantum-classical computing system of claim 16, wherein the matrix A is a fermionic Hamiltonian representing n spin orbitals as a sum of Pauli strings.

30. The hybrid quantum-classical computing system of claim 16, the classical computing component storing additional machine-readable instructions that control the classical computing component to cooperate with the quantum computing component to prepare the quantum b-state $|b\rangle$ on the quantum computing component before obtaining the measurement of overlap.

* * * * *